(12) United States Patent
Lee et al.

(10) Patent No.: US 12,548,896 B2
(45) Date of Patent: Feb. 10, 2026

(54) ANTENNA MODULE AND ELECTRONIC DEVICE COMPRISING THE ANTENNA MODULE

(71) Applicant: SAMSUNG ELECTRONICS CO., LTD., Suwon-si (KR)

(72) Inventors: Sangho Lee, Suwon-si (KR); Sangyong Park, Suwon-si (KR); Hyunchul Park, Suwon-si (KR); Kwanghyun Baek, Suwon-si (KR); Seungjae Baek, Suwon-si (KR); Seunghwan Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 504 days.

(21) Appl. No.: 18/079,432

(22) Filed: Dec. 12, 2022

(65) Prior Publication Data

US 2023/0105182 A1 Apr. 6, 2023

Related U.S. Application Data

(63) Continuation of application No. PCT/KR2022/011160, filed on Jul. 29, 2022.

(30) Foreign Application Priority Data

Sep. 8, 2021 (KR) .......................... 10-2021-0119683

(51) Int. Cl.
*H01Q 3/24* (2006.01)
*H01Q 9/04* (2006.01)

(52) U.S. Cl.
CPC ............. *H01Q 3/24* (2013.01); *H01Q 9/0407* (2013.01)

(58) Field of Classification Search
CPC ............................... H01Q 3/24; H01Q 9/0407
See application file for complete search history.

(56) References Cited

U.S. PATENT DOCUMENTS 10,469,122 B2 11/2019 Patel et al.
2015/0270645 A1* 9/2015 Sato ................... H01R 13/6471
439/651

(Continued)

FOREIGN PATENT DOCUMENTS

JP 2004-229208 8/2004
KR 10-2005-0053757 6/2005

(Continued)

OTHER PUBLICATIONS

Extended European Search Report dated Nov. 4, 2024 issued in European Patent Application No. 22867560.9.

(Continued)

*Primary Examiner* — Junpeng Chen
(74) *Attorney, Agent, or Firm* — NIXON & VANDERHYE P.C.

(57) ABSTRACT

An electronic device according to an example embodiment includes: a switch die including a first portion transmission path and a first portion reception path, the first portion transmission path being connected in parallel to a transmission switch, and the first portion reception path being connected in parallel to a reception switch; a first connecting unit comprising a conductive material connected to the first portion transmission path and a second connecting unit comprising a conductive material connected to the first portion reception path; and a radio unit (RU) board including a second portion transmission path connected to the first connecting unit and a second portion reception path connected to the second connecting unit.

20 Claims, 16 Drawing Sheets

(56) References Cited

U.S. PATENT DOCUMENTS

| | | | |
|---|---|---|---|
| 2020/0014358 A1 | 1/2020 | Park et al. | |
| 2020/0176887 A1* | 6/2020 | Lee | H01Q 9/0442 |
| 2022/0321163 A1* | 10/2022 | Avraham | H04B 1/525 |
| 2023/0163454 A1* | 5/2023 | Sato | H01Q 1/421 |
| | | | 343/873 |
| 2023/0361802 A1* | 11/2023 | Thakur | H04B 1/44 |

FOREIGN PATENT DOCUMENTS

| | | |
|---|---|---|
| KR | 10-2006-0094005 | 8/2006 |
| KR | 10-2007-0041050 | 4/2007 |
| KR | 10-2010-0095965 | 9/2010 |
| KR | 10-2014-0109993 | 9/2014 |
| KR | 10-2016-0077924 | 7/2016 |
| KR | 10-2019-0128077 | 11/2019 |
| KR | 10-2021-0044640 | 4/2021 |

OTHER PUBLICATIONS

International Search Report for PCT/KR2022/011160 mailed Nov. 7, 2022, 4 pages.

B. Sadhu, "A 28GHz 32-Element Phased-Array Transceiver IC with Concurrent Dual Polarized Beams and 1.4 Degree Beam-Steering Resolution for 5G Communication", ISSCC 2017, Session 7, Wireless Transceivers, Feb. 2017, 4 pages.

Office Action for KR Application No. 10-2021-0119683 dated Oct. 21, 2025 and English translation, 12 pages.

\* cited by examiner

ANTENNA MODULE AND ELECTRONIC DEVICE COMPRISING THE ANTENNA MODULE

CROSS-REFERENCE TO RELATED APPLICATIONS

This application is a continuation of International Application No. PCT/KR2022/011160 designating the United States, filed on Jul. 29, 2022, in the Korean Intellectual Property Receiving Office and claiming priority to Korean Patent Application No. 10-2021-0119683, filed on Sep. 8, 2021, in the Korean Intellectual Property Office, the disclosures of which are incorporated by reference herein in their entireties.

BACKGROUND

1. Field

The disclosure relates to an antenna module performing wireless communication and an electronic device comprising the antenna module.

2. Description of Related Art

Due to the development of technology, a communication device has become smaller, and various electronic devices have been providing network-based services using the communication device. Accordingly, not only portable terminals originally made for communication purposes (e.g., a cellular phone, a smartphone, and the like), but also conventional devices without communication functions have been providing various services using communication. In this instance, for convenient portability and avoiding an inconvenience of wired communication, wireless communication technology is generally used.

For wireless communication, an antenna for radiation of a signal is necessarily included. To transmit the signal via the antenna, the communication device generates a baseband signal from transmit data, generates a radio frequency (RF) signal via a radio frequency integrated circuit (RFIC), and then radiates the signal via the antenna. Furthermore, the communication device may receive the signal via the antenna.

An application using a millimeter wave (mmWave) of 10 GHz or more is widely spread not only in 5G communication for a mobile or 60 GHz communication, but also in a motion sensor product that detects a movement to increase a convenience of a user interface (I/F), a motion monitoring sensor product for security that identifies an intruder in a predetermined space, a 24 GHz or a 77 GHz radar system for detecting near-field and far-field for vehicles and the like. In case of a mmWave product, when a signal is transmitted from the RFIC to the antenna, or from the antenna to the RFIC, the signal needs to be transmitted such that loss of the signal does not occur as much as possible.

SUMMARY

Embodiments of the disclosure may provide an antenna module that includes a switch die including switches respectively connected in parallel to a transmission antenna and a reception antenna.

The tasks to be addressed are not limited to the foregoing.

According to various example embodiments, an electronic device may include: a switch die including a first portion transmission path and a first portion reception path, the first portion transmission path being connected in parallel to a transmission switch, and the first portion reception path being connected in parallel to a reception switch; a first connecting unit comprising a conductive material connected to the first portion transmission path and a second connecting unit comprising a conductive material connected to the first portion reception path; and a radio unit (RU) board including a second portion transmission path connected to the first connecting unit and a second portion reception path connected to the second connecting unit, wherein a length of a transmission path formed via the first portion transmission path, the first connecting unit, and the second portion transmission path is determined based on a wavelength (λ) of a frequency used to transmit a radio frequency (RF) transmission signal.

According to various example embodiments, a wireless communication device configured to communicate with a terminal may include: an antenna unit including a plurality of antennas; a power interface unit comprising circuitry configured to transmit and receive a signal via the antenna unit; an RF processing unit connected to the power interface unit and comprising circuitry configured to process the signal; and a control unit comprising circuitry configured to control an operation of the wireless communication device, wherein the RF processing unit includes a switch die including a first portion transmission path and a first portion reception path, the first portion transmission path being connected in parallel to a transmission switch, and the first portion reception path being connected in parallel to a reception switch, wherein the power interface unit includes a radio unit (RU) board including a second portion transmission path connected to the first portion transmission path via a first connecting unit comprising a conductive material and a second portion reception path connected to the first portion reception path via a second connecting path, and wherein a length of a transmission path formed via the first portion transmission path, the first connecting unit, and the second portion transmission path is determined based on a wavelength (λ) of a frequency used to transmit an RF transmission signal.

According to various example embodiments, a method of controlling an antenna switch, performed by an electronic device, may include: determining an antenna mode in which an antenna of the electronic device operates; and controlling the antenna switch connected to the antenna based on the antenna mode, the antenna switch including a transmission switch and a reception switch, wherein the electronic device includes: a switch die including a first portion transmission path and a first portion reception path, the first portion transmission path being connected in parallel to the transmission switch, and the first portion reception path being connected in parallel to the reception switch; a first connecting unit comprising a conductive material connected to the first portion transmission path and a second connecting unit comprising a conductive material connected to the first portion reception path; and a radio unit (RU) board including a second portion transmission path connected to the first connecting unit and a second portion reception path connected to the second connecting unit, wherein a length of a transmission path formed via the first portion transmission path, the first connecting unit, and the second portion transmission path is determined based on a wavelength (λ) of a frequency used to transmit an RF transmission signal.

According to various example embodiments, an antenna module that includes a switch die including switches respectively connected in parallel to a transmission antenna and a reception antenna, may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to the accompanying drawings. It should be understood, however, that there is no intent to limit this disclosure to the particular example embodiments disclosed. Example embodiments are intended to cover all modifications, equivalents, and alternatives falling within the scope of the example embodiments.

Figure 1:
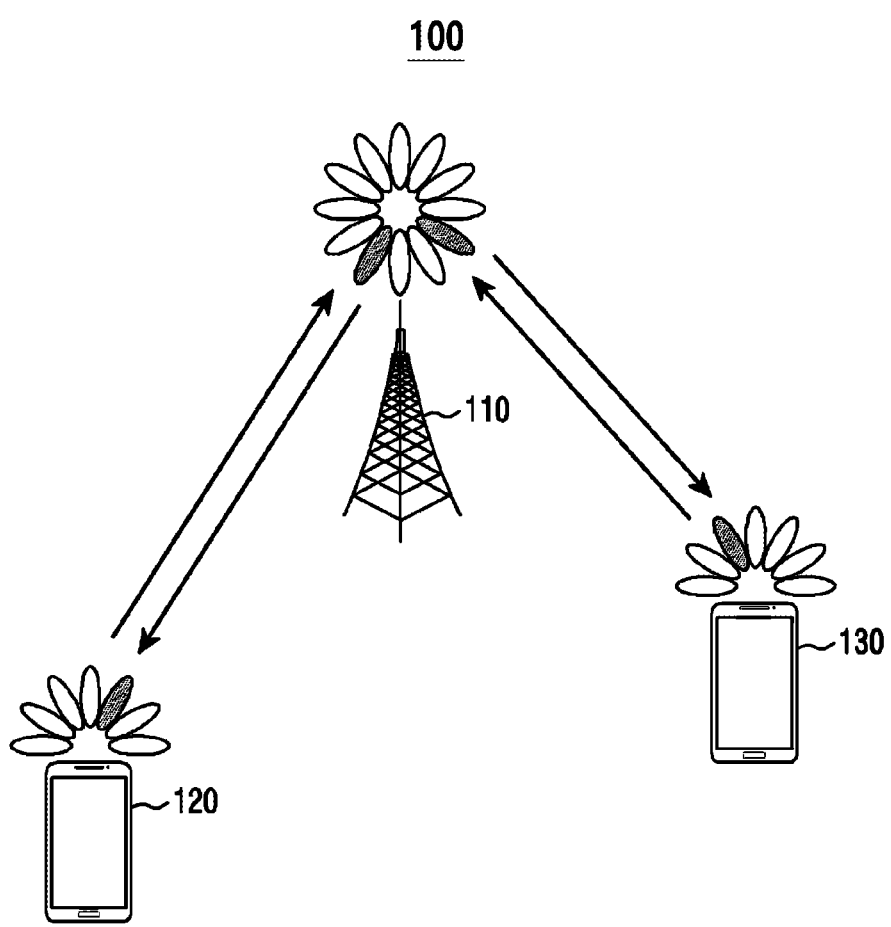
FIG. 1 is a diagram illustrating an example wireless communication system according to various embodiments.

FIG. 1 is a diagram illustrating an example wireless communication system according to various embodiments.

In a wireless communication environment 100 of FIG. 1, a base station 110 and a terminal 120 are illustrated as some nodes using a wireless channel.

The base station 110 may be a network infrastructure that provides a wireless connection to the terminal 120. The base station 110 may have a coverage defined as a predetermined geographical area based on a distance capable of transmitting a signal. The base station 110 may be referred to, other than a base station, as a massive multiple input multiple output (MIMO) unit (MMU), an access point (AP), an eNodeB (eNB), a $5^{th}$ generation (5G) node, a 5G NodeB (5G NB), a wireless point, a transmission/reception point (TRP), an access unit, a distributed unit (DU), a radio unit (RU), a remote radio head (RRH), or another term having an equivalent technical meaning. The base station 110 may transmit a downlink signal, or receive an uplink signal.

The terminal 120 is a device used by a user and may communicate with the base station 110 via the wireless channel. In some cases, the terminal 120 may operate without involving the user. That is, the terminal 120 is a device that performs machine-type communication (MTC) and may not be carried by the user. The terminal 120 may be referred to, other than a terminal, as user equipment (UE), a mobile station, a subscriber station, customer premises equipment (CPE), a remote terminal, a wireless terminal, an electronic device, a terminal for a vehicle, a user device, or another term having an equivalent technical meaning.

The terminal 120 and a terminal 130 illustrated in FIG. 1 may support vehicle communication. For vehicle communication, a standardization for vehicle-to-everything (V2X) technology based on a device-to-device (D2D) communication structure in a long-term evolution (LTE) system has been completed in the 3GPP Release 14 and Release 15, and currently, an effort to develop V2X technology based on 5G new radio (NR) has been proceeding. NR V2X may support unicast communication between terminals, groupcast (or multicast) communication, and broadcast communication.

A beamforming technique has been using as one of the techniques for alleviating radio wave path loss and increasing a transmission distance of the radio wave. In general, beamforming may use a plurality of antennas to concentrate an area at which the radio wave reaches, or to increase the directivity of reception sensitivity for a predetermined direction. Accordingly, a communication equipment may have the plurality of antennas to form a beamforming coverage, rather than use a single antenna to form a signal in an isotropic pattern. Hereinafter, an antenna array including a plurality of antennas is described.

The base station 110 or the terminal 120 may include the antenna array. Each antenna included in the antenna array may be referred to as an array element or an antenna element. Hereinafter, the antenna array is described as a two-dimensional planar array, but this is an example and other example embodiments are not limited thereto. For example, the antenna array may be configured in various forms, such as a linear array, a multilayer array, and the like. The antenna array may be referred to as a massive antenna array.

A major technique for improving data capacity in 5G communication may be a beamforming technique that uses the antenna array connected to a plurality of RF paths. To increase communication performance, the number of components for performing wireless communication has been increasing. In particular, as the number of antennas, the number of RF components (e.g., an amplifier, and a filter) for processing an RF signal transmitted or received via an antenna, and the number of components increase, the communication performance is satisfied when configuring the communication equipment, and accordingly, a spatial gain and cost efficiency may be required.

Figure 2A:
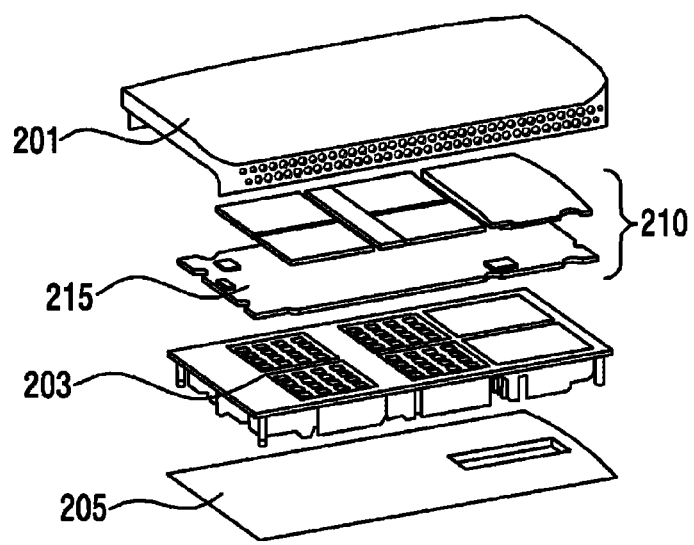
FIGS. 2A and 2B are diagrams illustrating examples of components of an electronic device according to various embodiments.
Figure 2A:
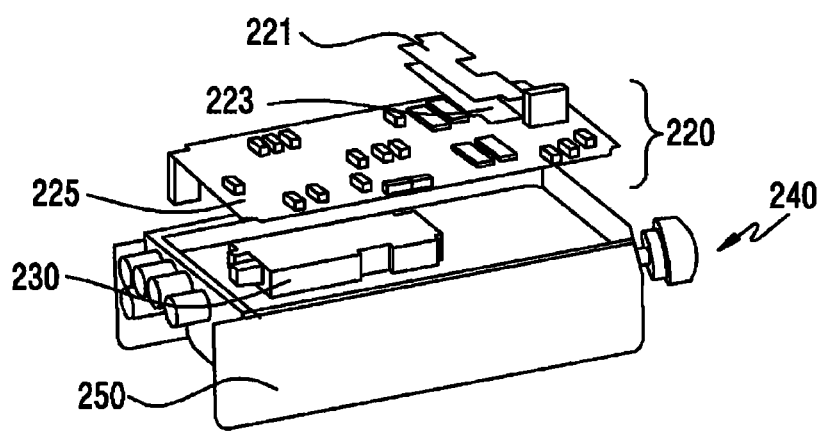
Figure 2B:
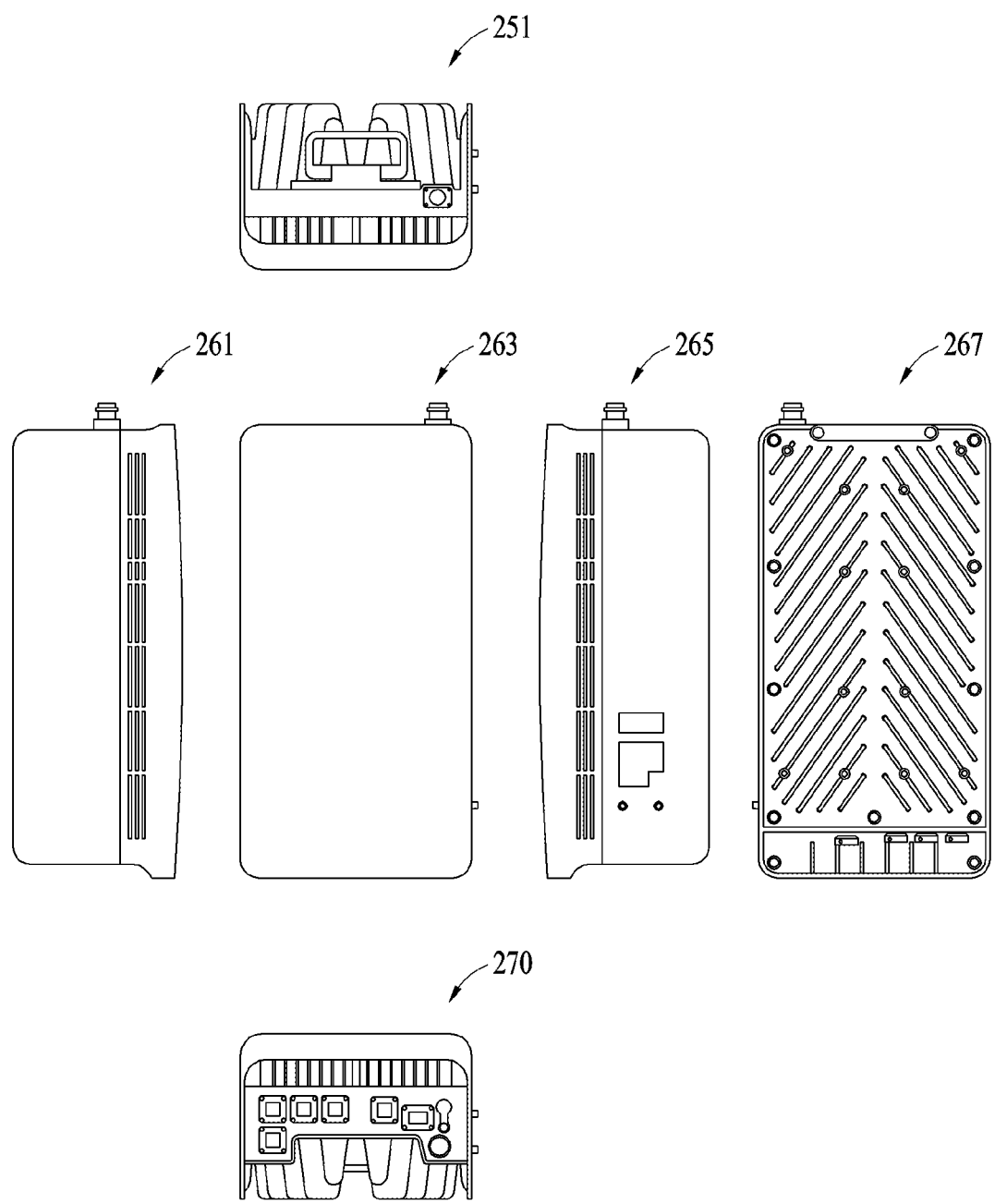

FIGS. 2A and 2B are diagrams illustrating examples of components of an electronic device according to various embodiments.

FIG. 2A illustrates internal components of the electronic device, and FIG. 2B illustrates the top surface, the bottom surface, and the side surface of the electronic device.

Referring to FIG. 2A, the electronic device may include a radome cover 201, an RU housing 203, a DU cover 205, and an RU 210. The RU 210 may include an antenna module and RF components for the antenna module. The RU 210 may include the antenna module having an air-based feed structure according to example embodiments described later. According to an example embodiment, the antenna module may include a ball grid array (BGA) module antenna. The RU 210 may include an RU board 215, on which the RF components are mounted.

The electronic device may include a DU 220. The DU 220 may include an interface board 221, a modem board 223, and a central processing unit (CPU) board 225. The electronic device may include a power module (e.g., including circuitry) 230, a global positioning system (GPS) 240, and a DU housing 250.

Referring to FIG. 2B, 251 illustrates a top view of the electronic device. 261, 263, 265, and 267 illustrate respectively illustrate left, front, right, and back views of the electronic device. 270 illustrates a bottom view of the electronic device.

Figure 3A:
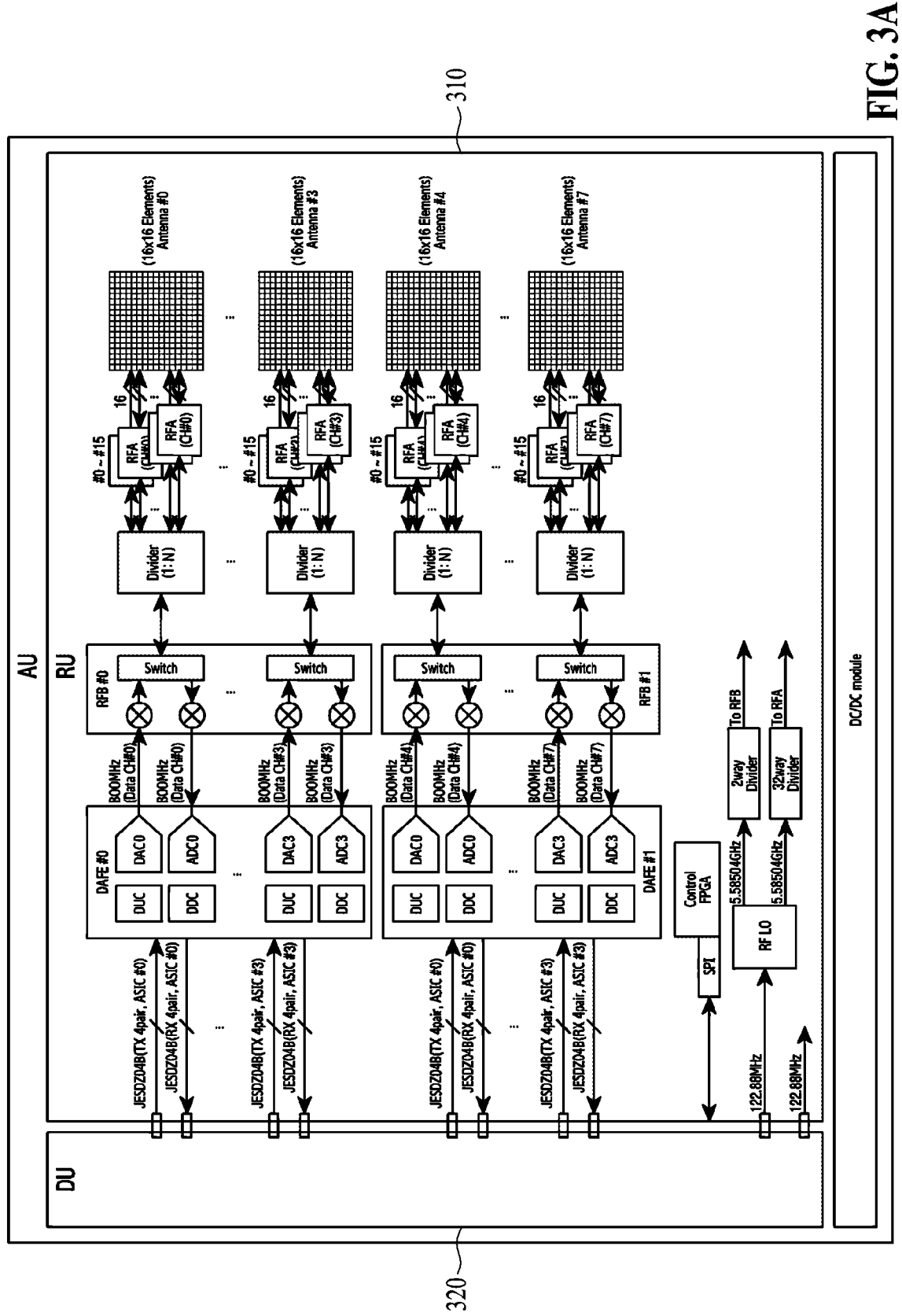
FIGS. 3A and 3B are diagrams illustrating examples of a functional configuration of an electronic device according to various embodiments.
Figure 3B:
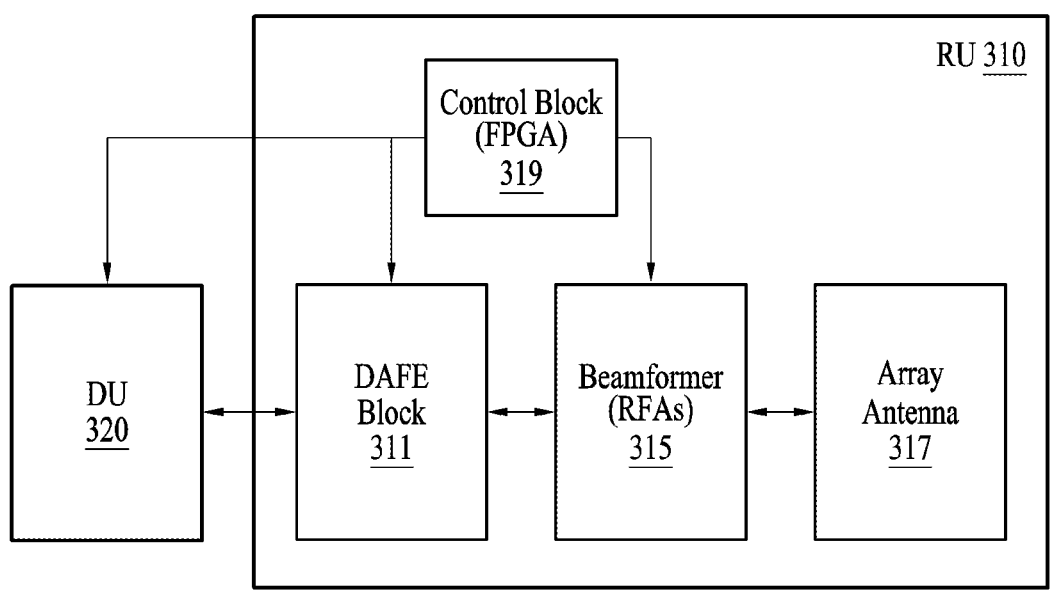

FIGS. 3A and 3B are diagrams illustrating examples of a functional configuration of an electronic device according to various embodiments.

The electronic device may include an access unit (AU). The AU may include an RU 310, a DU 320, and a direct current (DC)/DC module.

The RU 310 according to example embodiments may be an assembly on which antennas and RF components are mounted.

The DU 320 according to example embodiments may be configured to process a digital wireless signal and may be configured to encode the digital wireless signal to be transmitted to the RU 310, or to decode the digital wireless signal received from the RU 310. The DU 320 may be configured to communicate with a parent node (e.g., a centralized unit (CU)) or a core network (e.g., a 5G core (5GC), and an evolved packet core (EPC)) by processing packet data.

Referring to FIG. 3A, the RU 310 may include a plurality of antenna elements. The RU 310 may include one or more array antennas. According to an example embodiment, the array antenna may be configured as a planar antenna array. The array antenna may correspond to a single stream. The array antenna may include a plurality of antenna elements corresponding to a single transmission path (or reception path). For example, the array antenna may include 16×16, e.g., 256 antenna elements, but is not limited thereto.

The RU 310 may include RF chains for processing a signal of each of the array antennas. The RF chains may be referred to as "RFAs". An RFA may include RF components (e.g., a phase shifter, and a power amplifier) for beamforming and a mixer. The mixer of the RFA may be configured to down-convert an RF signal into an intermediate frequency (IF) signal or up-convert an IF signal into an RF signal.

According to an example embodiment, a single set of RF chains may correspond to a single array antenna. For example, the RU 310 may include 8 sets of RF chains for 8 array antennas. The plurality of RF chains may be connected to the transmission path or the reception path via 1:N (e.g., 1:16 or 1:24) dividers. Although not illustrated in FIG. 3A, according to an example embodiment, the RF chains may be implemented as an RFIC. The RFIC may process and generate RF signals supplied to the plurality of antenna elements.

The RU 310 may include a digital analog front end (DAFE) and an "RFB". The DAFE may be configured to interconvert between a digital signal and an analog signal. For example, the RU 310 may include two DAFEs (DAFE #0, and DAFE #1). In the transmission path, the DAFE may be configured to up-convert a digital signal (e.g., a digital up converter (DUC)) and to convert the up-converted signal into an analog signal (e.g., a digital-to-analog converter (DAC)). In the reception path, the DAFE may be configured to convert an analog signal into a digital signal (e.g., an analog-to-digital converter (ADC)), and to down-convert the digital signal (e.g., a digital down converter (DDC)). The RFB may include a mixer and a switch corresponding to the transmission path and the reception path. The mixer of the RFB may be configured to up-convert a baseband frequency into an IF, or down-convert an IF signal into a baseband frequency signal. The switch may be configured to select one of the transmission path and the reception path. For example, the RU 310 may include two RFBs (RFB #0 and RFB #1).

According to an example embodiment, DAFE chip #0 may be designed to merge DAFE #0 and RFB #0 and DAFE chip #1 may be designed to merge DAFE #1 and RFB #1.

The RU 310 is a controller and may include a field programmable gate array (FPGA). The FPGA may be a semiconductor device including a designable logic device and a programmable internal circuit. The designable logic device may perform programming by duplicating logic gates, such as an AND, an OR, an XOR, a NOT, and the like, and a more complex decoder function. The FPGA may further include a flip-flop or a memory. The FPGA may communicate with the DU 320 via serial peripheral interface (SPI) communication.

The RU 310 may include an RF local oscillator (LO). The RF LO may be configured to supply a reference frequency for up-conversion or down-conversion. The RF LO according to an example embodiment may be configured to provide a frequency for the up-conversion or the down-conversion of the RFB described above. For example, the RF LO may supply the reference frequency to RFB #0 and RFB #1 via a 2-way divider.

The RF LO according to an example embodiment may be configured to provide the frequency for the up-conversion or the down-conversion of the RFA described above. For example, the RF LO may supply the reference frequency to the respective RFAs (8 in each RF chain, per polarization group) via a 32-way divider.

Referring to FIG. 3B, the RU 310 may include a DAFE block 311, a beamformer 315, an array antenna 317, and a control block 319.

The DAFE block 311 may convert a digital signal into an analog signal, or convert an analog signal into a digital signal.

According to an example embodiment, the DAFE block 311 may include a function for IF up/down conversion. For example, a DAFE chip corresponding to the DAFE block 311 may be manufactured to merge functions of the RFBs (e.g., RFB #0 and/or RBF #1). The RFB may convert a baseband frequency signal into an IF signal, or convert an IF signal into a baseband frequency signal, based on the reference frequency supplied from the RF LO.

The RFB of the DAFE block 311 may be connected to a TX signal or an RX signal via the switch. The switch may be connected to the plurality of RFAs via 1:N (e.g., 1:16 or 1:24) dividers. "N" may vary.

The beamformer 315 may correspond to the RFA. The beamformer 315 may convert an RF signal into an IF signal or convert an IF signal into an RF signal, based on the reference frequency supplied from the RF LO.

The array antenna 317 may include the plurality of antenna elements. Each antenna element of the array antenna 317 may be configured to radiate the signal processed via the RFA. The array antenna 317 may be configured to perform beamforming according to a phase applied by the RFA.

The control block 319 may control each block of the RU 310 to perform a command from the DU 320 and the signal processing described above.

Although FIGS. 2A through 3B illustrate the base station as an example of the electronic device, the example embodiments of the electronic device are not limited to the base station. The described example embodiments may be applicable to not only the base station including the DU and the RU, but also an electronic device for radiation of a wireless signal.

As a transmission output is improved due to the development of technology, an equivalent reception performance needs to be secured, and support of a dual band (e.g., a 28 GHz band and a 39 GHz band) is also required. To address such needs and reduce the cost of an RFIC package, a Tx/Rx switch (e.g., a single pole double throw (SPDT) switch) may be used. An addition of the switch may cause an increase in insertion loss. For example, based on the same antenna array, 4 dB of the performance of the Tx and about 3.6 dB of the performance of the Rx may degrade. As the insertion loss of the switch at each band (e.g., a 28 GHz band and a 39 GHz band), a compensation for loss of about 1 dB may be required. In addition, an additional compensation may be required due to an increase in the number of elements and an increase in a gap between the elements. To satisfy the specification described above, example embodiments described hereinafter disclose an antenna module for improving feed loss of an antenna and an electronic device including the antenna module.

Figure 4:
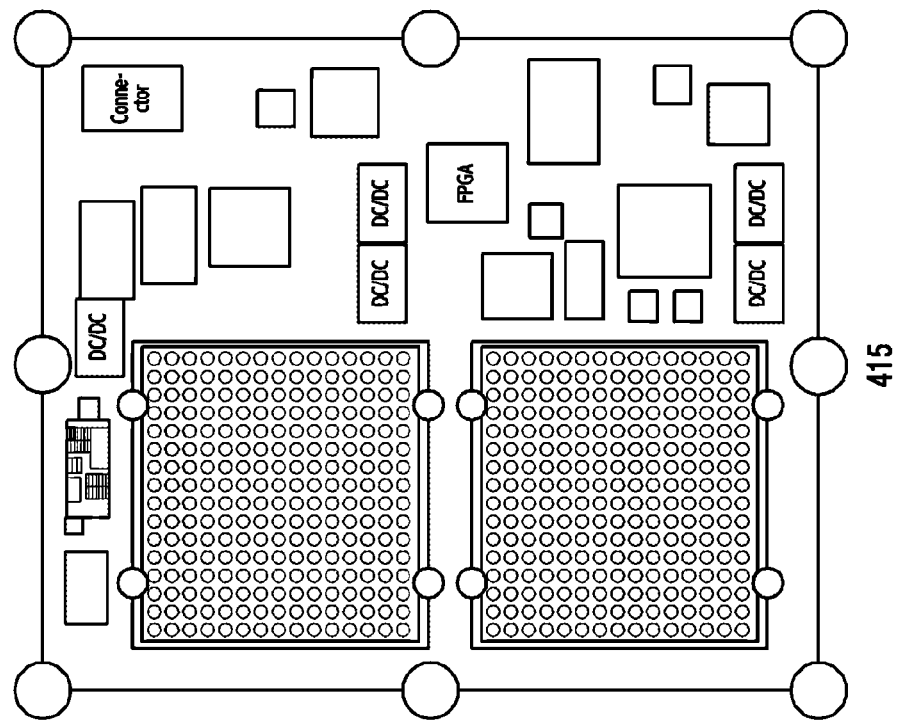
FIG. 4 is a diagram illustrating an example of a radio unit (RU) board of an electronic device according to various embodiments.
Figure 4:
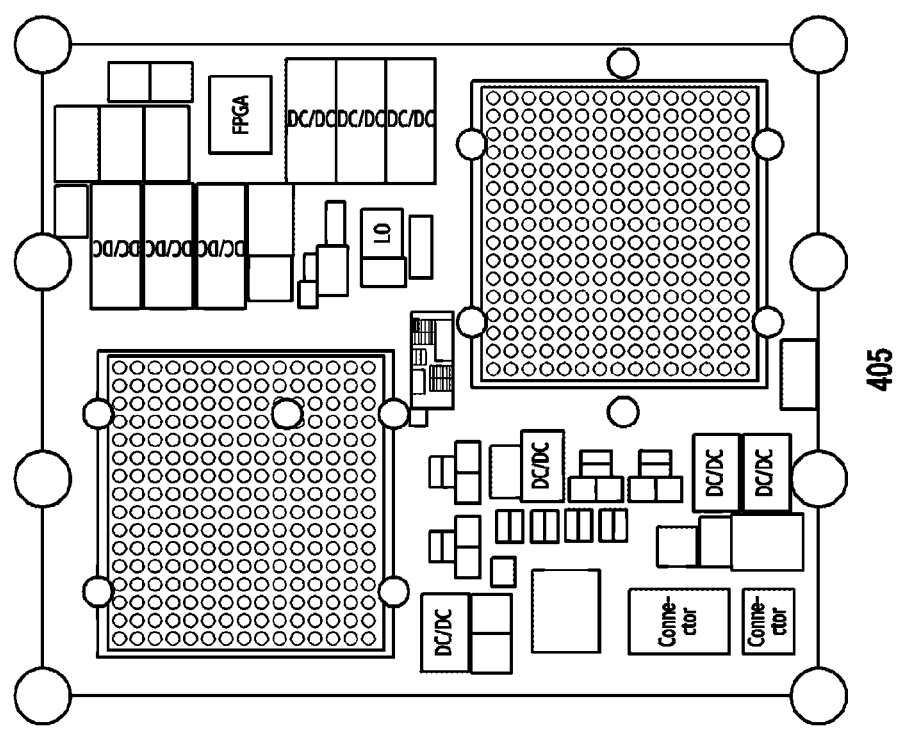

FIG. 4 is a diagram illustrating an example of an RU board of an electronic device according to various embodiments.

The electronic device may have a structure in which separately arranged are a printed circuit board (PCB) (hereinafter, a "first PCB") on which an antenna is mounted; array antennas; and a PCB (hereinafter, a "second PCB") on which components (e.g., a connector, a DC/DC converter, and a digital front end (DFE)) for signal processing are mounted. The first PCB may be referred to as an antenna board, an antenna substrate, a radiation substrate, a radiation board, or an RF board. The second PCB may be referred to as an RU board, a main board, a power board, a motherboard, a package board, or a filter board.

Referring to FIG. 4, the RU board may include components for transmitting a signal to a radiator (e.g., the antenna). According to an example embodiment, one or more antenna PCBs (i.e., first PCBs) may be mounted on the RU board. That is, one or more array antennas may be mounted on the RU board. For example, two array antennas may be mounted on the RU board.

According to an example embodiment, in 405 of FIG. 4, the array antennas may be disposed at a symmetrical position on the RU board.

According to another example embodiment, in 415 of FIG. 4, the array antennas may be disposed at one side (e.g., the left) of the RU board and RF components described later may be disposed at the other side (e.g., the right) of the RU board.

Although two array antennas are illustrated in FIG. 4, the configuration of the array antennas is not limited thereto. For example, the two array antennas may be disposed for each band to support a dual band and the array antennas mounted on the RU board may be configured to support 2-transmit 2-receive (2T2R).

According to an example embodiment, the RU board may include components for supplying an RF signal to the antenna. For example, the RU board may include one or more DC/DC converters. The DC/DC converter may be used to convert direct current into direct current.

According to an example embodiment, the RU board may include one or more LOs. The LO may be used to supply a reference frequency for up-conversion or down-conversion in an RF system.

According to an example embodiment, the RU board may include one or more connectors. The connector may be used to transmit an electrical signal.

According to an example embodiment, the RU board may include one or more dividers. The divider may be used to distribute an input signal and transmit the input signal to a multipath.

According to an example embodiment, the RU board may include one or more low-dropout (LDO) regulators. The LDO regulator may be used to suppress external noise and supply power. The LDO regulator is a regulator having a high efficiency when an output voltage is lower than an input voltage and a voltage difference between the input voltage and the output voltage is small and may remove noise of input power. Since the LDO regulator has a low output impedance, the LDO regulator may stabilize the circuit by positioning a dominant pole in the circuit.

According to an example embodiment, the RU board may include one or more voltage regulator modules (VRMs). The VRM may be a module for ensuring that an appropriate voltage is maintained.

According to an example embodiment, the RU board may include one or more DFEs.

According to an example embodiment, the RU board may include one or more RF programmable gain amplifiers (PGAs).

According to an example embodiment, the RU board may include one or more IF processing units.

In the configuration illustrated in FIG. 4, some of the components illustrated in FIG. 4 may be omitted, or more components may be mounted. Furthermore, although not illustrated in FIG. 4, the RU board may further include an RF filter for filtering a signal.

Figure 5:
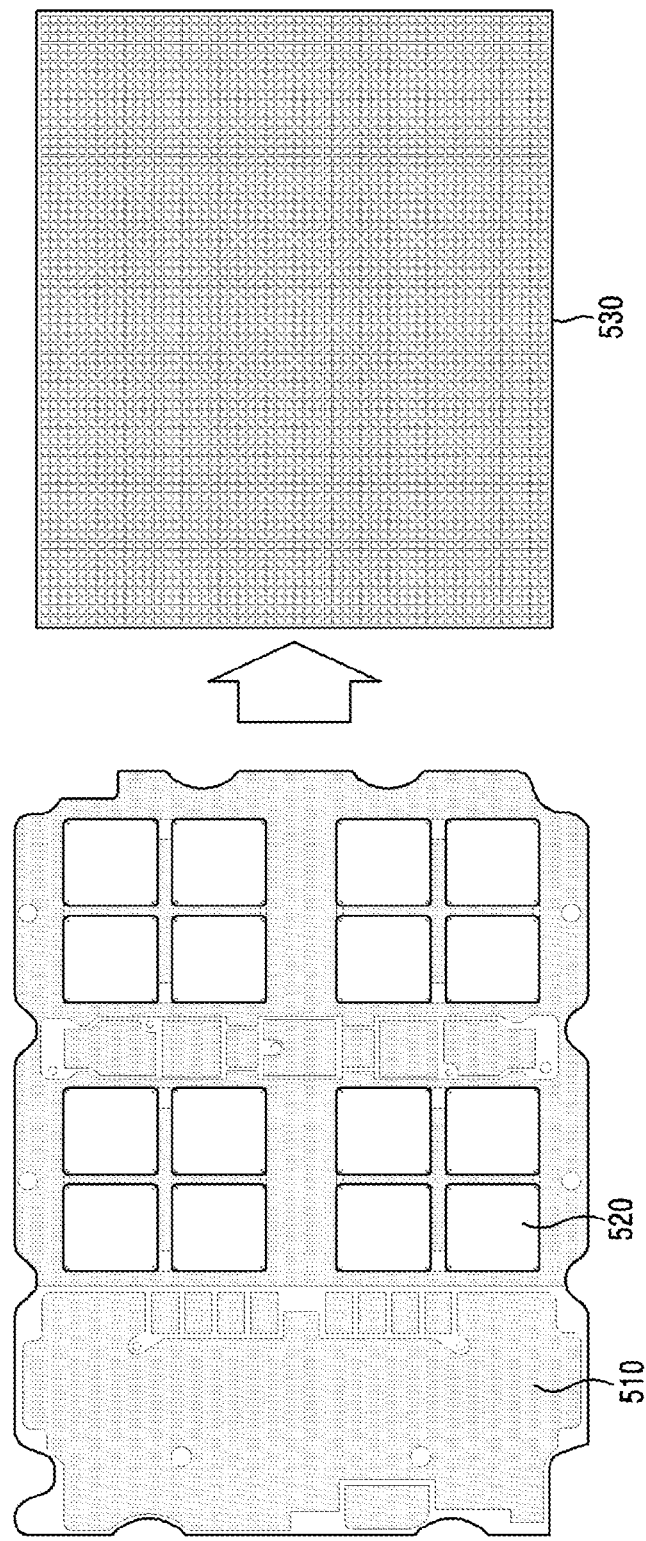
FIG. 5 is a diagram illustrating an example arrangement between an RU board and an antenna unit of an electronic device according to various embodiments.

FIG. 5 is a diagram illustrating an example of an arrangement between an RU board and an antenna unit of an electronic device according to various embodiments.

An electronic device according to an example embodiment may include a modular type of an antenna. As the number of antenna elements mounted on the electronic device increases for a mmWave frequency band, an assembly process and a mass production reliability in the manufacturing process may considerably affect performance.

A connection structure through lamination may have difficulty in securing reliability and stable performance as the weight increases. Furthermore, such a structure may have a disadvantage in mass production due to a complex supply chain management (SCM). Therefore, a performance connection structure that is adapted to mass production and robust for assembly intervals may be required. Example embodiments described hereinafter may disclose a measure for connecting the antenna to the RU board (e.g., the second PCB) via direct interconnection, rather than via a coupling feed. For direct interconnection, a grid array may be used.

Referring to FIG. 5, example embodiments may disclose a connection structure having an advantage in cost, while securing reliability and increasing a degree of freedom in design and performance, by modularizing the grid array (e.g., a BGA). Hereinafter, to explain the modularized grid array, a board (hereinafter, "antenna board") on which antenna elements are mounted may be referred to as a single antenna unit. That is, the plurality of antenna elements may be mounted on the antenna board and the plurality of antenna elements mounted on the antenna board may be referred to as a single antenna unit. For example, assuming an 8×8 arrangement, a single unit may include 64 antenna elements.

According to an example embodiment, an RU board 510 may include 16 antenna units 520. In this instance, an antenna unit 520 may include 64 antenna elements. Based on the example illustrated in FIG. 5, 4 antenna units may correspond to a single array antenna and correspond to 1-transmit 1-receive (1T1R). The RU board may include a 4T4R array structure. According to an example embodiment, the RU board may include a grid array module 530 for each antenna board corresponding to the antenna unit. Although not illustrated in FIG. 5, each antenna board may be coupled to a single grid array module 530 (e.g., a BGA module). The grid array module 530 may be coupled to the RU board corresponding to a main PCB.

Figure 6:
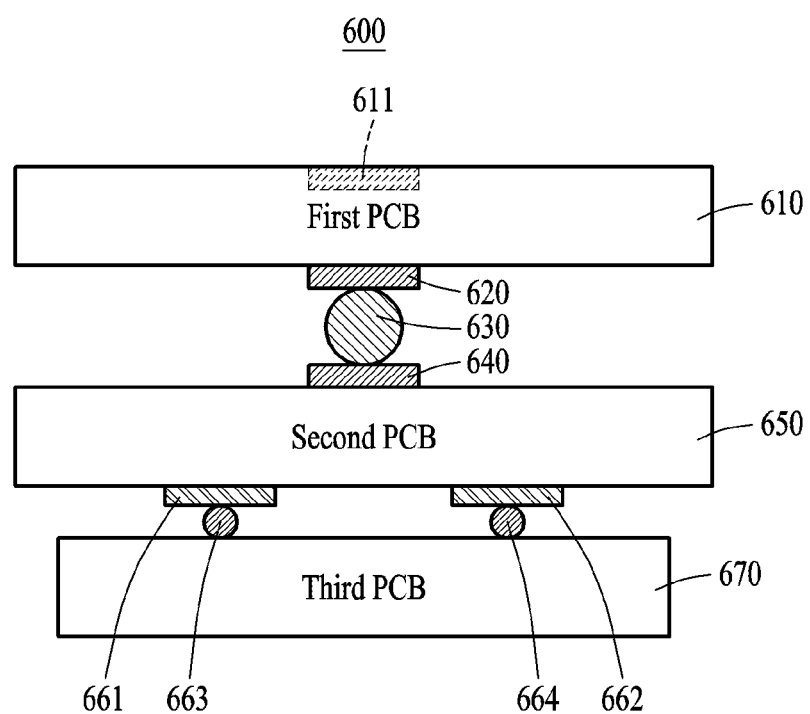
FIG. 6 is a diagram illustrating an example connection structure of printed circuit boards (PCBs) according to various embodiments.
Figure 7:
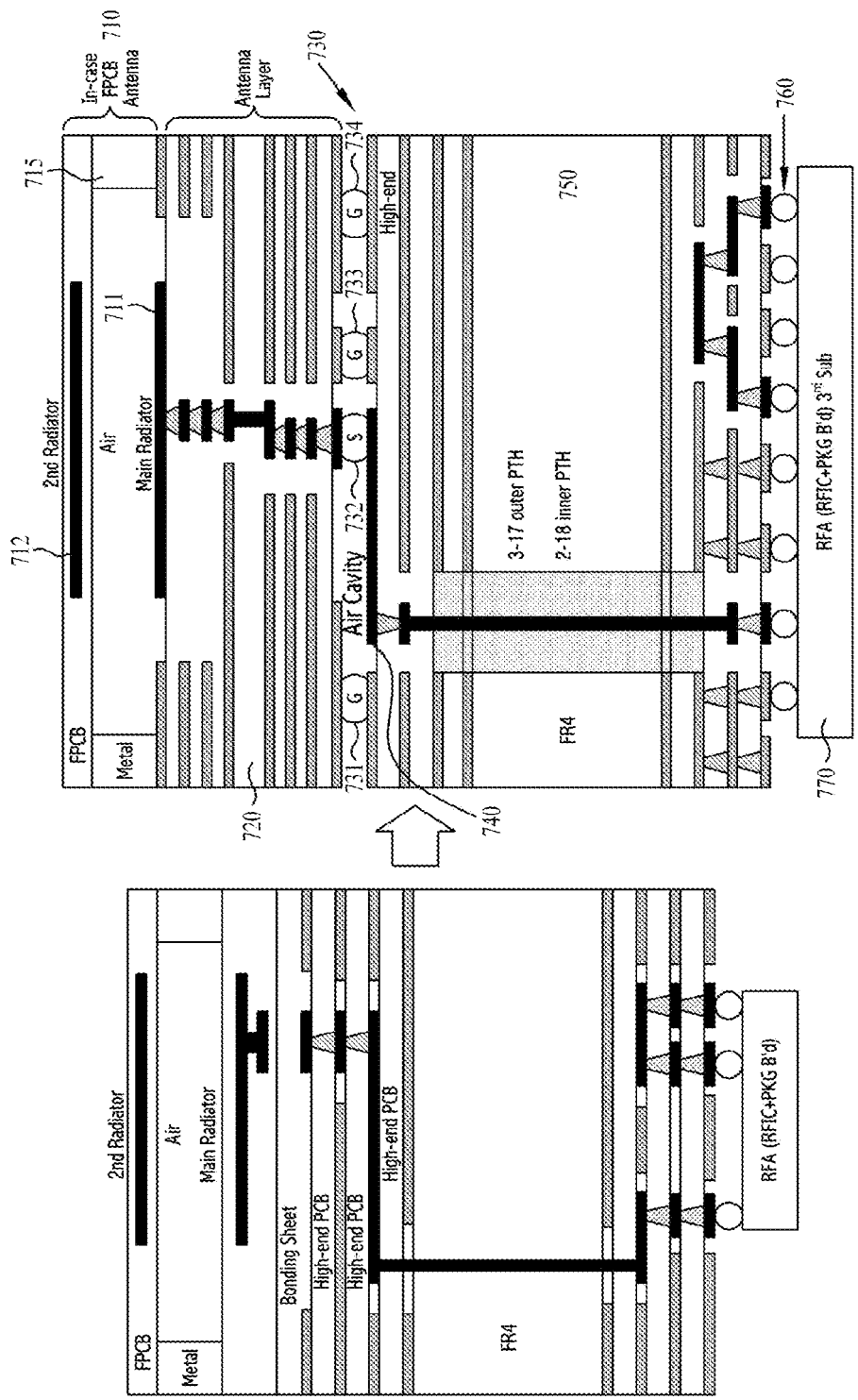
FIG. 7 is a diagram illustrating an example of a laminated structure of an electronic device including an air-based feed structure according to various embodiments.

As described above with reference to FIG. 5, coupling through lamination or a bonding sheet may not be enough to provide the mass production reliability and high performance Through FIGS. 6 and 7, a measure for connecting the antenna to the RU board via the direct interconnection, rather than the coupling feed, is described in greater detail.

FIG. 6 is a diagram illustrating an example connection structure of PCBs according to various embodiments.

According to an example embodiment, an electronic device may include a first PCB 610 (e.g., an antenna board) including an antenna 611; connecting units 620, 630, and 640 for connecting a second PCB 650 to the first PCB 610; the second PCB 650 (e.g., an RU board or a main board); connecting units 661, 662, 663, and 664 between the second PCB 650 and a third PCB 670; and the third PCB 670 capable of generating or processing an RF signal. The third PCB 670 may be referred to as a "switch die" to be distinguished from other PCBs.

According to an example embodiment, the third PCB may be a part of a package board of an RFA or an RFIC. For example, the package board of an RFA or an RFIC may be implemented based on the second PBC 650 and the third PCB 670. For example, on a single RFIC, a single antenna array including a plurality of antennas (e.g., 16 antennas) may be connected.

The first PCB 610 and the second PCB 650 may be substrates in which a circuit is formed. The first PCB 610 and the second PCB 650 may form a circuit for connecting (or, joining) respective circuit components on a surface of the substrate or in the substrate, based on the designed circuit.

According to an example embodiment, the first PCB 610 and the second PCB 650 may be configured by at least one substrate being laminated. For example, the first PCB 610 may include a circuit wiring for joining the antenna 611 to the respective circuit components. For example, the second PCB 650 may include a circuit wiring for joining an RF element to the respective circuit components.

According to an example embodiment, at least one antenna 611 may be disposed in the first PCB 610. For example, the antenna 611 may be a patch antenna. The patch antenna may be formed via a scheme of forming a predetermined metal shape on a circuit substrate, and the metal shape may be formed on the top surface of the first PCB 610 to include the antenna 611.

The second PCB 650 may be a substrate for the circuit wiring between the third PCB 670 described above and another circuit component. The second PCB 650 may be configured by the plurality of substrates being laminated.

The top surface of the second PCB 650 may be coupled to the bottom surface of the first PCB 610 using various methods, and FIG. 6 illustrates a scheme of connecting the first PCB 610 to the second PCB 650 via a connecting unit. For example, the connecting unit may include the matchings 620 and 640 (or a bump) and a ball 630.

For electrical connection between the antenna 611 or other circuit components and the RF element of the third PCB 670, the first PCB 610 and the second PCB 650 need to be electrically connected to each other. For example, a grid array is formed on the bottom surface of the first PCB 610 such that the first PCB 610 and the second PCB 650 are electrically connected to each other via the grid array. For example, the grid array may be a land grid array (LGA) or a BGA. The LGA is a scheme of arranging a chip electrode on the bottom surface of a substrate in an array form and due to a low inductance of a lead, the LGA may be a scheme adapted to a module that requires a high processing speed. The BGA is a scheme of arranging solder on the bottom surface of a substrate in an array form and may be a scheme adapted to a module that requires multiple pins.

Although not illustrated in FIG. 6, a plurality of capacitors may be disposed on the bottom surface of the second PCB 650. Via the capacitors, noise occurring in an internal circuit of the second PCB 650 may be removed, thereby securing the stability of the circuit. For example, since a capacitor is disposed on a substrate, the capacitor may be a surface mount device (SMD)-type capacitor.

The RF element of the third PCB 670 coupled to the bottom surface of the second PCB 650 may be a high frequency chip for wireless communication and may include an RFIC chip in which an RF circuit is implemented on a single semiconductor chip using an active element and a passive element. The RF element may include an amplifier, a transmitter, a receiver, a synthesizer, and the like.

According to an example embodiment, an RF transmission signal generated by the transmitter of the RF element may be transmitted to the second PCB 650 via a first bump 661 and/or a first ball 663. The transmitter may include a circuit that generates the RF transmission signal to be radiated via the antenna 611. The receiver of the RF element may receive an RF reception signal from the second PCB 650 via a second bump 662 and/or a second ball 664.

FIG. 7 is a diagram illustrating an example of a laminated structure of an electronic device including an air-based feed structure according to various embodiments.

Referring to FIG. 7, the electronic device may include an antenna unit 710. According to an example embodiment, the antenna unit 710 may be an in-case flexible PCB (FPCB) antenna. The antenna unit 710 may include a main radiator 711 and a second radiator 712 formed on a cover. The antenna unit 710 may include a metal post 715 for supporting the cover. The in-case FPCB illustrated in FIG. 7 is an example of the antenna unit 710, but the antenna unit 710 is not limited thereto. For example, the antenna unit of the electronic device may solely include a main radiator 711.

The electronic device may include an antenna board 720. The antenna board 720 is a PCB on which antenna elements are mounted and may be referred to as a first PCB. The first PCB 720 may include a plurality of layers. In this instance, a main radiator 711 may be disposed on a topmost layer (i.e., a first layer) of the first PCB. Although FIG. 7 is a cross-sectional view, not only a single antenna element (e.g., the main radiator 711) but also a plurality of antenna elements may be mounted on a first layer of the first PCB. The plurality of antenna elements may be referred to as an antenna unit as described with reference to FIG. 4. The first PCB may include feed layers configured to transmit a signal through the plurality of layers.

According to an example embodiment, the antenna unit 710 and the antenna board 720 described with reference to FIG. 7 may be included in the first PCB 610 described with reference to FIG. 6.

A connecting unit, such as a grid array, may be disposed between the antenna board 720 and a second PCB 750. A signal may be transmitted via direct contact. "G" may be a ground path, and "S" may be a signal path. According to an example embodiment, the antenna board 720 may be coupled to a grid array 730. For example, the grid array 730 may be a BGA. The grid array 730, which is a BGA, may be coupled to the antenna board 720. The grid array 730, which is a BGA, may include a plurality of balls 731, 732, 733, and 734. Some of the plurality of balls (e.g., the ball 731, the ball 733, and the ball 734) may be between the first PCB and the second PCB (i.e., corresponding to the RU board) to be configured to couple the first PCB to the second PCB. Each of the ball 731, the ball 733, and the ball 734 may function as a ground path. Some of the plurality of balls (e.g., the ball 732) may be configured to function as a signal line for transmitting the RF signal between the antenna board 720 and the second PCB 750. According to an aspect, in addition to a ball, the grid array 730, which is a BGA, may further include one or more bumps coupled to the ball. The bump may be on the first PCB and/or the second PCB.

Due to the volume of the ball, a gap may be between the antenna board 720 and the second PCB 750, and accordingly, an air cavity may be formed between the balls due to the gap between the antenna board 720 and the second PCB 750. Due to the air cavity, there may be no dielectric loss. According to the above-described structure, a feed line may be formed not only in a position close to the antenna board, but also in an air gap, thereby reducing feed loss. Hereinafter, the arrangement structure in which the feed line is formed in the air gap may be referred to as the air-based feed structure.

According to an example embodiment, a feed line 740 may be formed on a topmost layer of the second PCB 750. The feed line 740 may be electrically connected to the antenna board 720 via the ball 732, which is a contact element of the grid array.

According to another example embodiment, a feed line may be formed on the antenna board 720. For example, the feed line may be disposed on a bottommost layer of the antenna board 720. The feed line may be electrically connected to the second PCB 750 via a ball, which is the contact element of the grid array.

According to another example embodiment, some feed lines may be formed on the bottommost layer of the antenna board 720, and some other feed lines may be formed on the topmost layer of the second PCB 750. The feed lines formed on the second PCB 750 may be electrically connected to the feed lines formed on the antenna board 720 via a ball, which is the contact element of the grid array.

According to an example embodiment, the second PCB 750 described with reference to FIG. 7 may correspond to the second PCB 650 described with reference to FIG. 6.

The second PCB 750 may be connected to an RFA 770 via a grid array 760. The RFA 770 may include a plurality of components for RF signal processing. The RFA 770 may be implemented in a form in which an RFIC is disposed on a package board. The plurality of components for RF signal processing are components for beamforming and may include a phase shifter, a power amplifier, and a mixer. To process a plurality of signals based on each antenna board, the RFIC may include a plurality of RF chains. Each of the RF chains may include components corresponding to at least one antenna element. In this instance, the package board of the RFA 770 may be referred to as a third PCB (e.g., the third PCB 670 of FIG. 6).

According to an example embodiment, the RFIC may be disposed on the other surface of the package board, rather than disposed in the package board. That is, one surface of the third PCB may be coupled to the second PCB 750 via the grid array and the other surface of the third PCB may be coupled to the RFIC. In such a structure of the package board, the air-based feed structure described above may be used for feeding to the RFIC.

In FIG. 7, although a BGA is illustrated as an example of the grid array, which is a connecting unit, examples of the grid array are not limited thereto. In addition to the BGA, various other connecting units, for example, an LGA and a pin grid array (PGA), may be used.

According to an example embodiment, a time division duplex (TDD) may be used as a scheme for transmitting and receiving the RF signal using a single antenna (e.g., the antenna 611 of FIG. 6). To use the TDD, a separation between a transmission feed line and a reception feed line may be required. In a case that the transmission feed line is not properly separated from the reception feed line, quality of the wireless communication may be deteriorated due to interference between the RF signals.

For a reduction of interference between the RF signals, there may be a scheme of separating electrical connection between the transmission feed line and the reception feed line and a scheme of using an electromagnetic property of the RF signal while maintaining the electrical connection between the transmission feed line and the reception feed line. The scheme of separating electrical connection between the transmission feed line and the reception feed line may require an additional TX-RX switch disposed between the transmission feed line and the reception feed line, and loss due to the additional TX-RX switch may be added. Conversely, the scheme of using an electromagnetic property of the RF signal may not change a structure of the existing feed line, and accordingly, loss may not occur.

According to an example embodiment, the scheme of using an electromagnetic property of the RF signal may be a scheme of using the electromagnetic property of a wavelength ($\lambda$) of the frequency used to transmit and receive the RF signal. For example, the used frequency may be an mmWAVE (e.g., 28 GHz). When the RF signal proceeded at a predetermined frequency proceeds by a distance (or, a distance corresponding to a phase of 90 degrees) of ¼ of the wavelength of the predetermined frequency, an impedance for the corresponding distance is close to infinity, and thus, there may be an open state in which the RF signal does not flow.

For example, in a case of transmitting the RF transmission signal via the transmission feed line (e.g., the TX mode), when the reception feed line is changed to be in the open state for the RF signal, interference due to the reception feed line may be removed. Conversely, in a case of receiving the RF reception signal via the reception feed line (i.e., the RX mode), when the transmission feed line is changed to be in the open state for the RF signal, interference due to the transmission feed line may be removed.

Below, a structure of the PCBs capable of reducing interference between the feed lines using the electromagnetic property of the RF signal is described in greater detail with reference to FIGS. 8 through 11.

Figure 8:
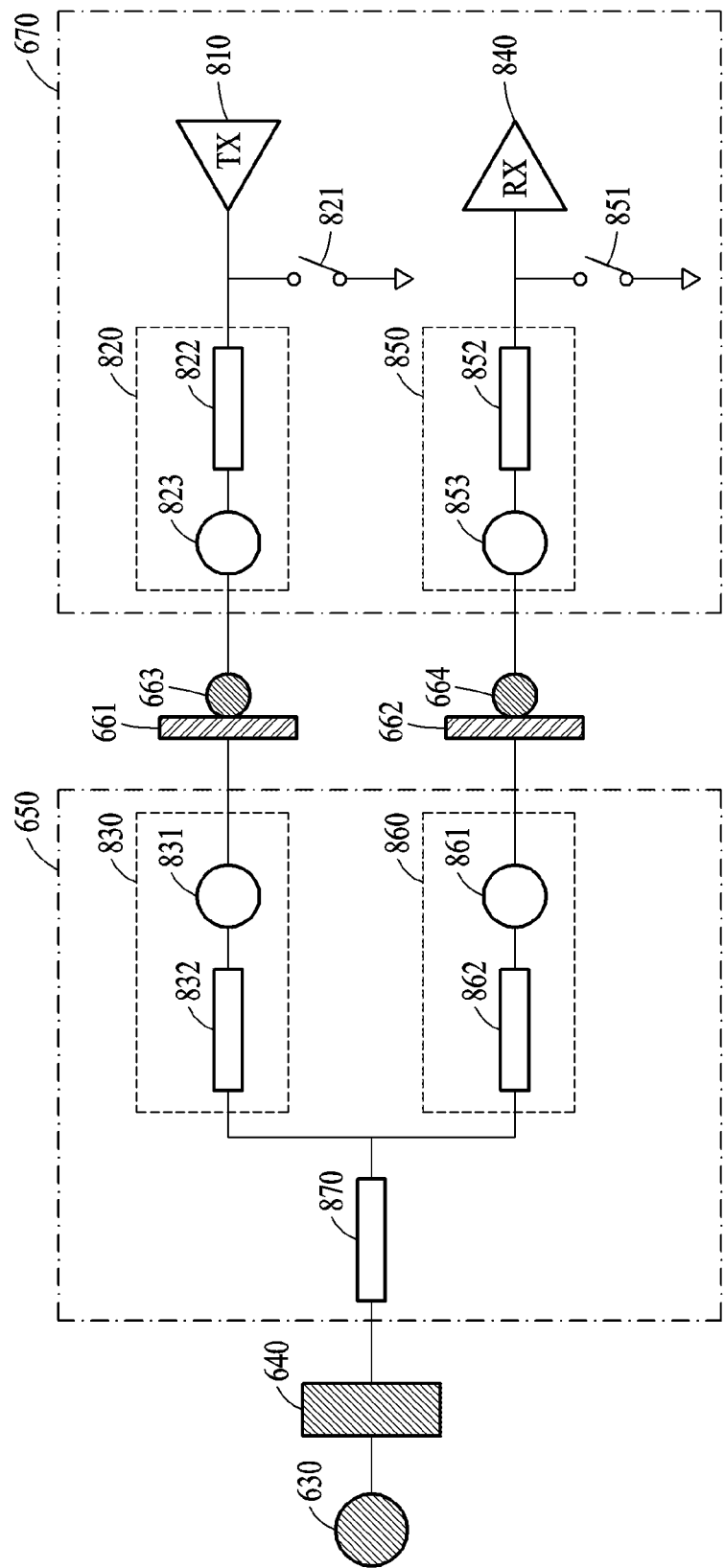
FIG. 8 is a diagram illustrating an antenna transmission path and an antenna reception path that are formed by a third PCB, connecting units, and a second PCB according to various embodiments.

FIG. 8 is a diagram illustrating an example antenna transmission path and an antenna reception path that are formed by a third PCB, connecting units, and a second PCB according to various embodiments.

According to an example embodiment, the third PCB 670 described with reference to FIG. 6 may include a first portion transmission path 820 connected to a transmitter 810 and a transmission switch 821 connected in parallel to the first portion transmission path 820 and may also include a first portion reception path 850 connected to a receiver 840 and a reception switch 851 connected in parallel to the first portion reception path 850. For example, the transmission switch 821 and the reception switch 851 may be implemented based on a complementary metal-oxide semiconductor (CMOS), but are not limited thereto. The first portion transmission path 820 and the first portion reception path 850 in the third PCB 670 may not be electrically connected to each other.

According to an example embodiment, the first portion transmission path 820 may include a first transmission line (TRL) 822 and a first via 823. A first end of the transmission switch 821 may be connected in parallel to the first portion transmission path 820, and a second end may be connected to ground. The first portion reception path 850 may include a third TRL 852 and a third via 853. A first end of the reception switch 851 may be connected in parallel to the first portion reception path 850, and a second end may be connected to ground.

For example, the first portion transmission path 820 may be connected to the second PCB 650 described with reference to FIG. 6 via the first bump 661 and/or the first ball 663. For example, the first portion reception path 850 may be connected to the second PCB 650 via the second bump 662 and/or the second ball 664.

According to an example embodiment, the second PCB 650 may include a second portion transmission path 830 connected to the first bump 661 and a second portion reception path 860 connected to the second bump 662. In addition, the second PCB 650 may further include a common path 870 connecting the second portion transmission path 830 to the second portion reception path 860 in parallel. The common path 870 may merge the second portion transmission path 830 and the second portion reception path 860 into a single path. The common path 870 may be connected to an antenna (e.g., the antenna 611 of FIG. 6) of a first PCB (e.g., the first PCB 610 of FIG. 6) via the connecting units 630 and 640.

According to an example embodiment, the second portion transmission path 830 may include a second via 831 and a second TRL 832. The second portion reception path 860 may include a fourth via 861 and a fourth TRL 862. The common path 870 may connect the second TRL 832 to the fourth TRL 862 in parallel.

Figure 9A:
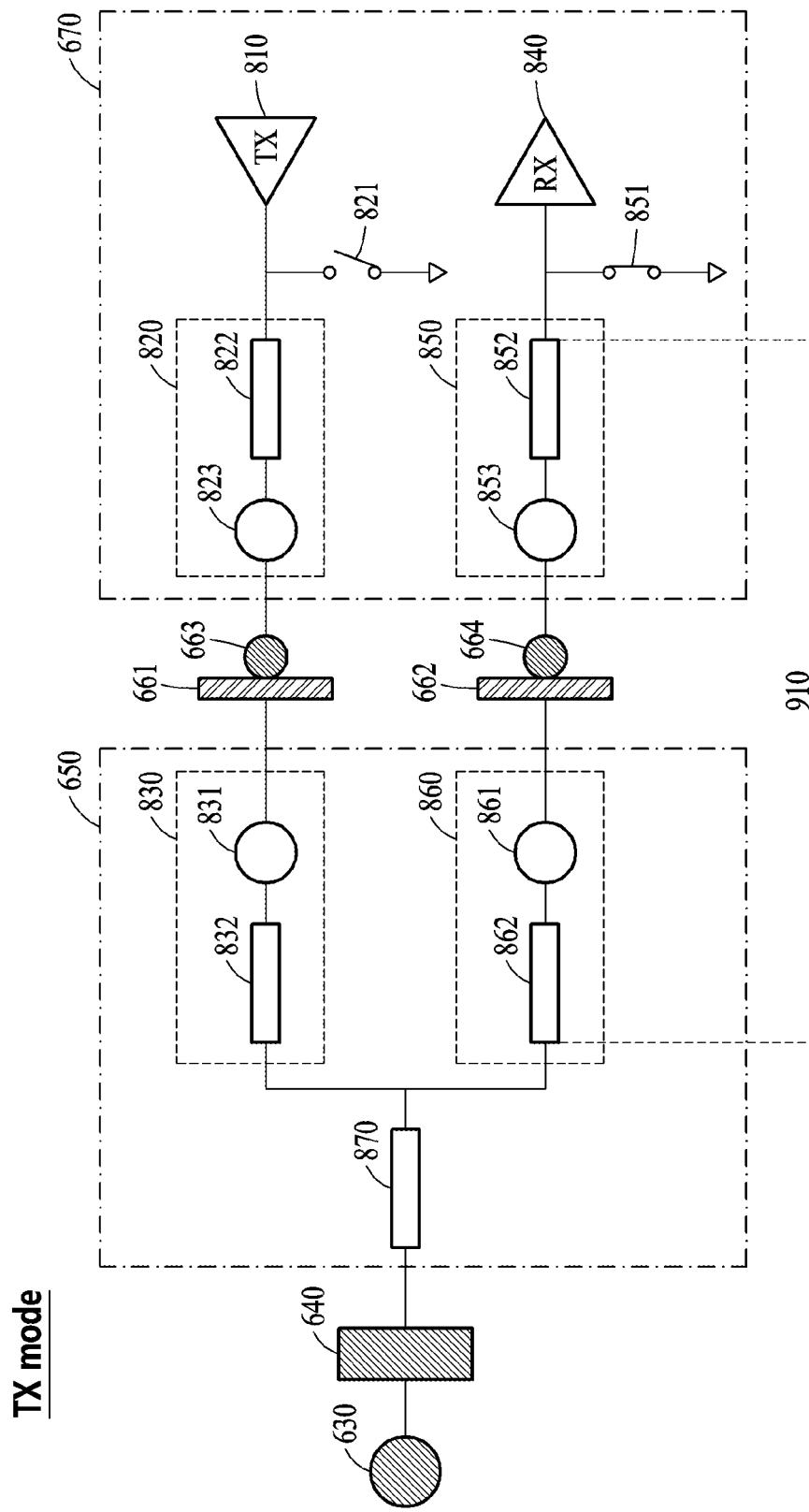
FIG. 9A is a diagram illustrating an example operation of antenna switches in a transmission mode according to various embodiments.

FIG. 9A is a diagram illustrating an example operation of antenna switches in a transmission mode according to various example embodiments.

In order for the electronic device described with reference to FIGS. 1 through 8 to operate a predetermined antenna in a transmission mode, the transmission switch 821 connected in parallel to the first portion transmission path 820 may open and the reception switch 851 connected in parallel to the first portion reception path 850 may close. When the reception switch 851 closes, a first path may be formed via the first portion reception path 850, the second bump 662, the second ball 664, and the second portion reception path 860. For example, the length of the first path 910 may correspond to a distance of ¼ of a wavelength of a predetermined frequency used to transmit an RF signal.

According to an example embodiment, when the reception switch 851 closes, and the length of the first path 910 corresponds to the distance of ¼ of the wavelength of the transmission frequency, an impedance of the first path 910 may be infinite due to the property of the wavelength of the predetermined frequency for the length of the first path 910. When the impedance of the first path 910 is infinite, the first path 910 may be regarded as being opened. When the first path 910 is opened, interference between the RF signal transmitted via the transmission path, and the reception path may not occur. Since interference between the transmission path and the reception path does not occur, transmission quality of the RF signal may improve.

Figure 9B:
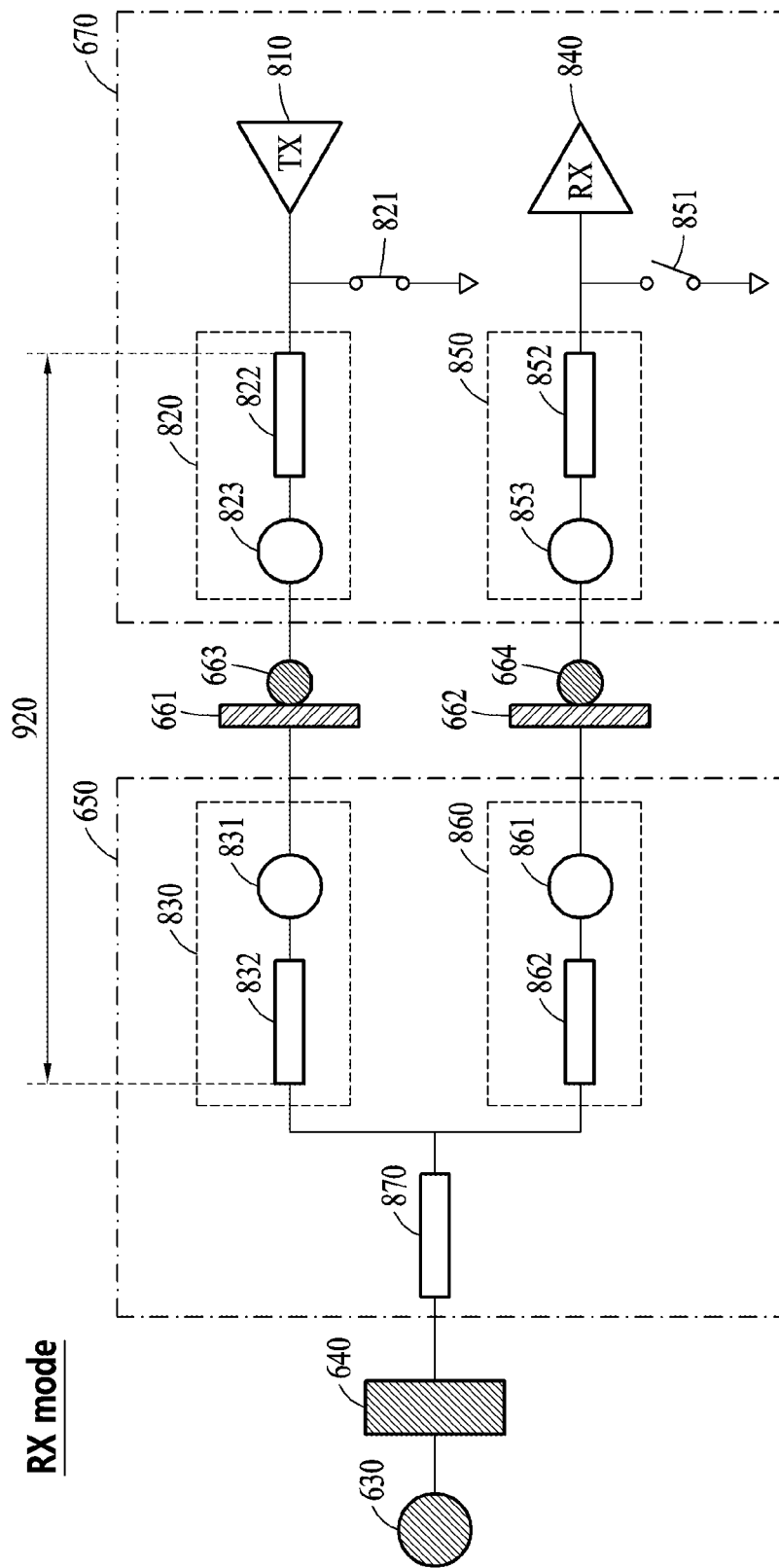
FIG. 9B is a diagram illustrating an example operation of antenna switches in a reception mode according to various embodiments.

FIG. 9B is a diagram illustrating an example operation of antenna switches in a reception mode according to various embodiments.

In order for the electronic device described with reference to FIGS. 1 through 8 to operate a predetermined antenna in a reception mode, the reception switch 851 connected in parallel to the first portion reception path 850 may open, and the transmission switch 821 connected in parallel to the first portion transmission path 820 may close. When the transmission switch 821 closes, a second path may be formed via the first portion transmission path 820, the first bump 661, the first ball 663, and the second portion transmission path 830. For example, the length of the second path 920 may correspond to a distance of ¼ of a wavelength of a predetermined frequency used to receive an RF signal.

According to an example embodiment, when the transmission switch 821 closes, and the length of the second path 920 corresponds to the distance of ¼ of the wavelength of the reception frequency, an impedance of the second path 920 may be infinite due to the property of the wavelength of the predetermined frequency for the length of the second path 920. When the impedance of the second path 920 is infinite, the second path 920 may be regarded as being opened. When the second path 920 is opened, interference between the RF signal received via the reception path, and the transmission path may not occur. Since interference between the reception path and the transmission path does not occur, reception quality of the RF signal may improve.

Figure 10:
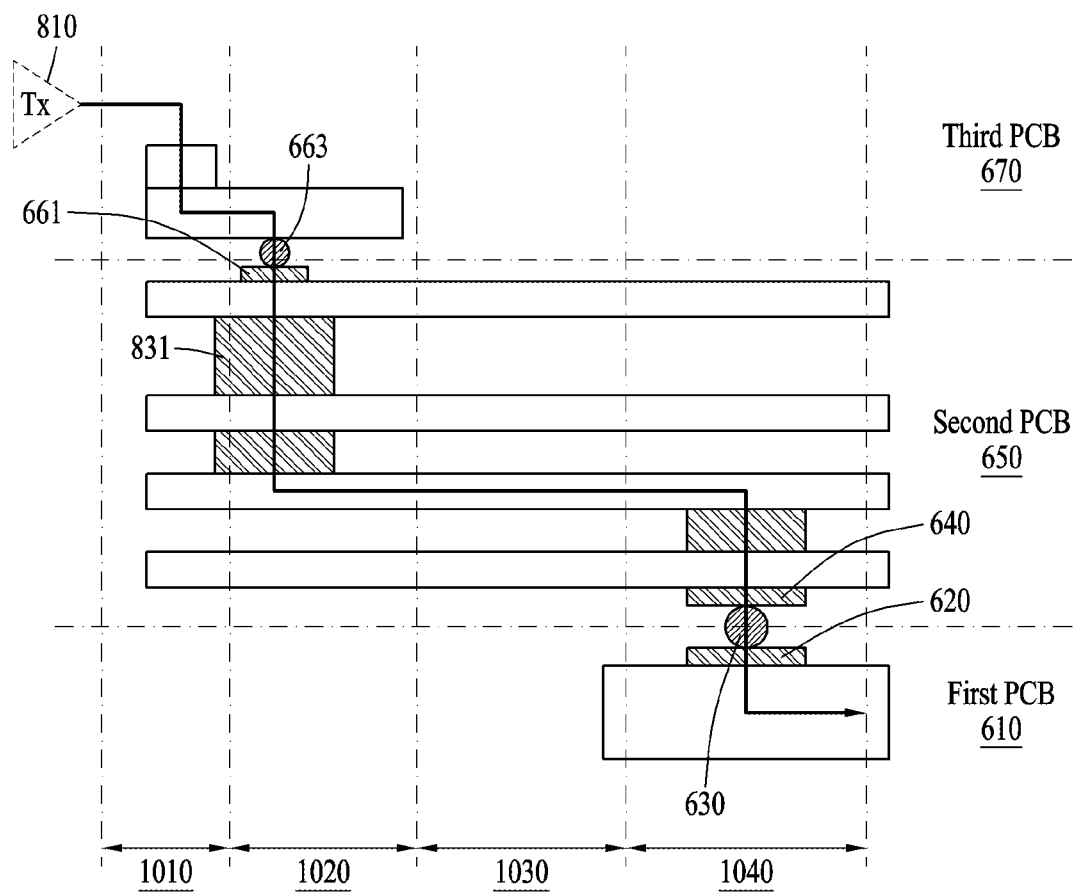
FIG. 10 is a cross-sectional view illustrating PCBs and connecting units according to various embodiments.

FIG. 10 is a cross-sectional view illustrating PCBs and connecting units according to various embodiments.

According to an example embodiment, a transmission signal, which is an RF signal generated by the transmitter 810 in a transmission mode, may be transmitted to the antenna 611 connected to the first PCB 610 via a path 1010 formed by the first portion transmission path 830 in the third PCB 670, a path 1020 formed by the first ball 663, the first bump 661, and the second via 831, a path 1030 formed by the second TRL 832 in the second PCB 650, and a path 1040 formed by the common path 870 and the connecting units 620, 630, and 640. As the reception switch 851 is closed while the transmission signal is transmitted via the paths 1010, 1020, 1030, and 1040, some paths (e.g., the first path 910) of the reception paths corresponding to the paths 1010, 1020, and 1030 may be regarded as being opened. The sum of phases of some paths of the reception paths corresponding to the paths 1010, 1020, and 1030 may be 90 degrees. As some paths of the reception paths are opened, transmission quality may improve.

According to an example embodiment, the RF signal received via the antenna 611 in a reception mode may be transmitted to the receiver 840 via the reception paths corresponding to the paths 1010, 1020, 1030, and 1040. As the transmission switch 821 is closed while the reception signal is transmitted via the reception paths corresponding to the paths 1010, 1020, 1030, and 1040, the paths 1010, 1020, and 1030 may be regarded as being opened. The sum of phases of the paths 1010, 1020, and 1030 may be 90 degrees. As some paths of the transmission paths are opened, the reception path may improve.

Figure 11:
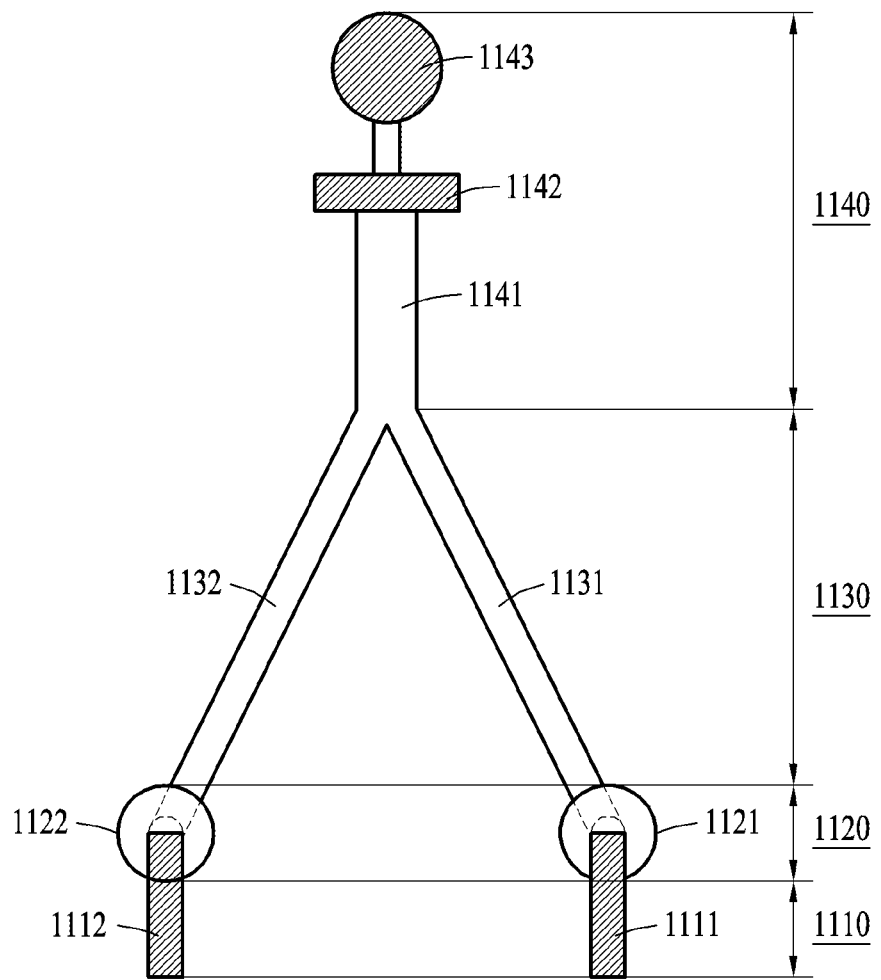
FIG. 11 is a diagram illustrating a transmission path, a reception path, and a common path according to various embodiments.

FIG. 11 is a diagram illustrating a transmission path, a reception path, and a common path according to various embodiments.

According to an example embodiment, a transmission path and a reception path may be classified into a first section 1110, a second section 1120, and a third section 1130, and a common path may be classified into a fourth section 1140. The sum of phases for the first section 1110, the second section 1120, and the third section 1130 may be 90 degrees.

According to an example embodiment, the transmission path may include a first microstrip 1111, a transmission via set 1121, and a transmission TRL 1131. For example, the first microstrip 1111 may correspond to the first TRL 822 of FIG. 8, the transmission via set 1121 may include the first via 823 of FIG. 8, the first ball 663, the first bump 661, and the second via 831, and the transmission TRL 1131 may correspond to the second TRL 832. At least one element (e.g., the first via 823) of the transmission via set 1121 may be connected to a signal-ground, and an impedance matching and a phase may be adjusted using the signal-ground. A transmission impedance matching may be adjusted by adjusting at least one of the width and the length of the transmission TRL 1131. For example, a transmission switch (e.g., the transmission switch 821 of FIG. 8) may be connected to the first microstrip 1111.

According to an example embodiment, the reception path may include a second microstrip 1112, a reception via set 1122, and a reception TRL 1132. For example, the second microstrip 1112 may correspond to the third TRL 852 of FIG. 8, the reception via set 1122 may include the third via 853 of FIG. 8, the second ball 664, the second bump 662, and the fourth via 861, and the reception TRL 1132 may correspond to the fourth TRL 862. At least one element (e.g., the third via 853) of the reception via set 1122 may be connected to the signal-ground, and the impedance matching and the phase may be adjusted using the signal-ground. A reception impedance matching may be adjusted by adjusting at least one of the width and the length of the reception TRL 1132. For example, a reception switch (e.g., the reception switch 851 of FIG. 8) may be connected to the second microstrip 1112.

According to an example embodiment, the common path may include a common TRL 1141 and connecting units 1142 and 1143. For example, the common TRL 1141 may correspond to the common path 870 of FIG. 8 and the connecting units 1142 and 1143 may correspond to the connecting units 630 and 640 of FIG. 6. An impedance matching may be adjusted by adjusting at least one of the width and the length of the common path 1141 and the connecting units 1142 and 1143.

According to an example embodiment, when an antenna mode is a reception mode, the transmission switch may close and an impedance of the transmission path corresponding to the first section 1110, the second section 1120, and the third section 1130 may be infinite. Conversely, when the antenna mode is a transmission mode, the reception switch may close and the impedance of the reception path corresponding to the first section 1110, the second section 1120, and the third section 1130 may be infinite.

Figure 12:
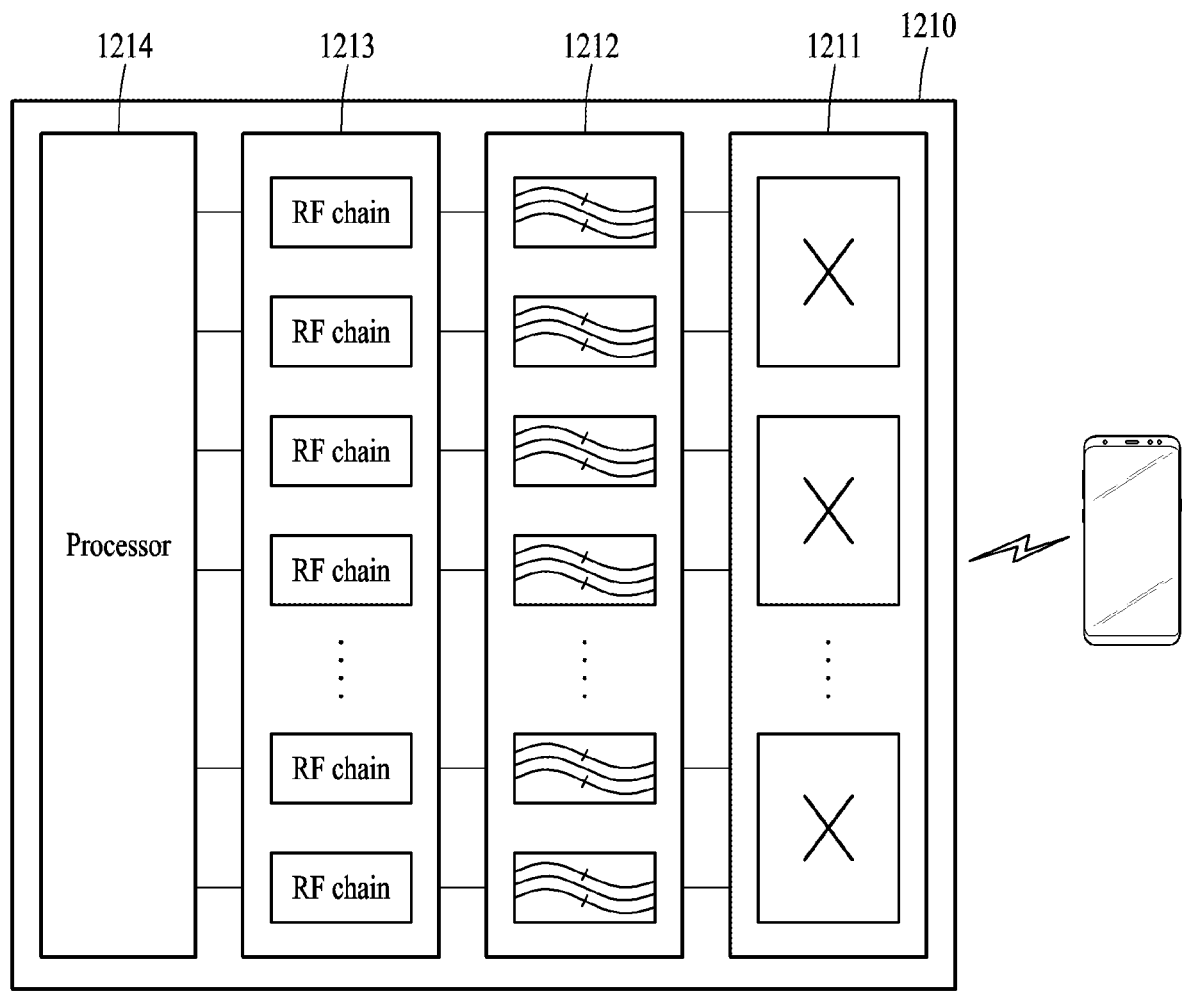
FIG. 12 is a diagram illustrating an example functional configuration of an electronic device having an air-based feed structure according to various embodiments.

FIG. 12 is a diagram illustrating a functional configuration of an electronic device according to various embodiments.

An electronic device 1210 according to an example embodiment may be one of the base station 110 or the terminal 120 of FIG. 1. According to an example embodiment, the electronic device 1210 may be base station equipment that supports mmWave communication (e.g., Frequency Range 2 of 3GPP). The electronic device 1210 may include an antenna structure described with reference to FIGS. 1 through 11. For example, the electronic device 1210 may include RF equipment with an air-based feed structure. The electronic device 1210 may be referred to as a "wireless communication device".

Referring to FIG. 12, an example of the functional configuration of the electronic device 1210 is illustrated. The electronic device 1210 may include an antenna unit (e.g., including an antenna) 1211, a power interface unit (e.g., including circuitry) 1212, an RF processing unit (e.g., including RF processing circuitry) 1213, and a control unit (e.g., including control circuitry) 1214.

According to an example embodiment, the antenna unit 1211 may include a plurality of antennas. The antenna may perform functions for transmitting and receiving a signal via a wireless channel. The antenna may include a radiator formed of a conductor formed on a substrate (e.g., a PCB), or a conductive pattern. The antenna may radiate an up-converted signal on the wireless channel or obtain the signal radiated by another device. Each antenna may be referred to as an antenna element or an antenna device. In some example embodiments, the antenna unit 1211 may include an antenna array in which a plurality of antenna elements form an array. The antenna unit 1211 may be electrically connected to the power interface unit 1212 via RF signal lines. The antenna unit 1211 may be mounted on a PCB including a plurality of antenna elements. According to an example embodiment, the antenna unit 1211 may be mounted on an FPCB. The antenna unit 1211 may provide the received signal to the power interface unit 1212 or radiate the signal provided from the power interface unit 1212 into the air.

According to an example embodiment, the power interface unit 1212 may include various circuitry in a module and components. For example, the power interface unit 1212 may include one or more IFs. For example, the power interface unit 1212 may include one or more LOs. For example, the power interface unit 1212 may include one or more LDOs. For example, the power interface unit 1212 may include one or more DC/DC converters. For example, the power interface unit 1212 may include one or more DFEs. For example, the power interface unit 1212 may include one or more FPGAs. For example, the power interface unit 1212 may include one or more connectors. For example, the power interface unit 1212 may include a power supply.

According to an example embodiment, the power interface unit 1212 may include areas for mounting one or more antenna modules. For example, the power interface unit 1212 may include a plurality of antenna modules for supporting MIMO communication. The antenna module according to the antenna unit 1211 may be mounted on the corresponding area.

According to an example embodiment, the power interface unit 1212 may include a filter. The filter may perform filtering to transmit a signal of a desired frequency. The filter may perform a function for selectively identifying a frequency by forming resonance. The power interface unit 1212 may include at least one of a band pass filter, a low pass filter, a high pass filter, and a band reject filter. That is, the power interface unit 1212 may include RF circuits for obtaining the signal of a frequency band for transmission or the signal of a frequency band for reception. The power interface unit 1212 according to various example embodiments may electrically connect the antenna unit 1211 to the RF processing unit 1213.

According to an example embodiment, the RF processing unit 1213 may include various RF processing circuitry including, for example, a plurality of RF processing chains. The RF processing chain may include a plurality of RF elements. The RF elements may include an amplifier, a mixer, an oscillator, a DAC, and an ADC. According to some example embodiments, the RF processing chain may be an RFIC. For example, the RF processing unit 1213 may include an up-converter that up-converts a digital transmission signal of a baseband into a transmission frequency and the DAC that converts the up-converted digital transmission signal into an analog RF transmission signal. The up-converter and the DAC may form a part of a transmission path. The transmission path may further include a power amplifier (PA) or a coupler (or a combiner). Furthermore, in an example, the RF processing unit 1213 may include an ADC that converts an analog RF reception signal into a digital reception signal and a down-converter that converts the digital reception signal into a digital reception signal of a baseband. The ADC and the down-converter may form a part of a reception path. The reception path may further include a low-noise amplifier (LNA) or a coupler (or a divider). RF components of the RF processing unit may be implemented on a PCB. The base station 1210 may include a structure in which the antenna unit 1211, the power interface unit 1212, and the RF processing unit 1213 are laminated in sequential order. The antennas, the RF components of the power interface unit, and the RFICs may be implemented on a separate PCB, and the filters are repeatedly coupled between the PCBs to form a plurality of layers.

According to an example embodiment, the control unit 1214 may include various control or processing circuitry and control all operations of the electronic device 1210. The control unit 1214 may include various modules for performing communication. The control unit 1214 may include at least one processor, such as a modem. The control unit 1214 may include modules for digital signal processing. For example, the control unit 1214 may include the modem. When data is transmitted, the control unit 1214 may generate complex symbols by encoding and modulating a transmission bit stream. Furthermore, in an example, when data is received, the control unit 1214 may restore a reception bit stream by demodulating and decoding a baseband signal. The control unit 1214 may perform functions of a protocol stack required by a communication standard.

Referring to FIG. 12, a functional configuration of the electronic device 1210 is illustrated as equipment capable of utilizing the antenna structure described with reference to FIGS. 1 through 11. The electronic device 1210 illustrated in FIG. 12 is an example of the configuration for utilization of the RF filter structure according to various example embodiments described with reference to FIGS. 1 through 11, and the antenna structure described with reference to FIGS. 1 through 10 is not limited to the example embodiments provided for the electronic device 1210.

Figure 13:
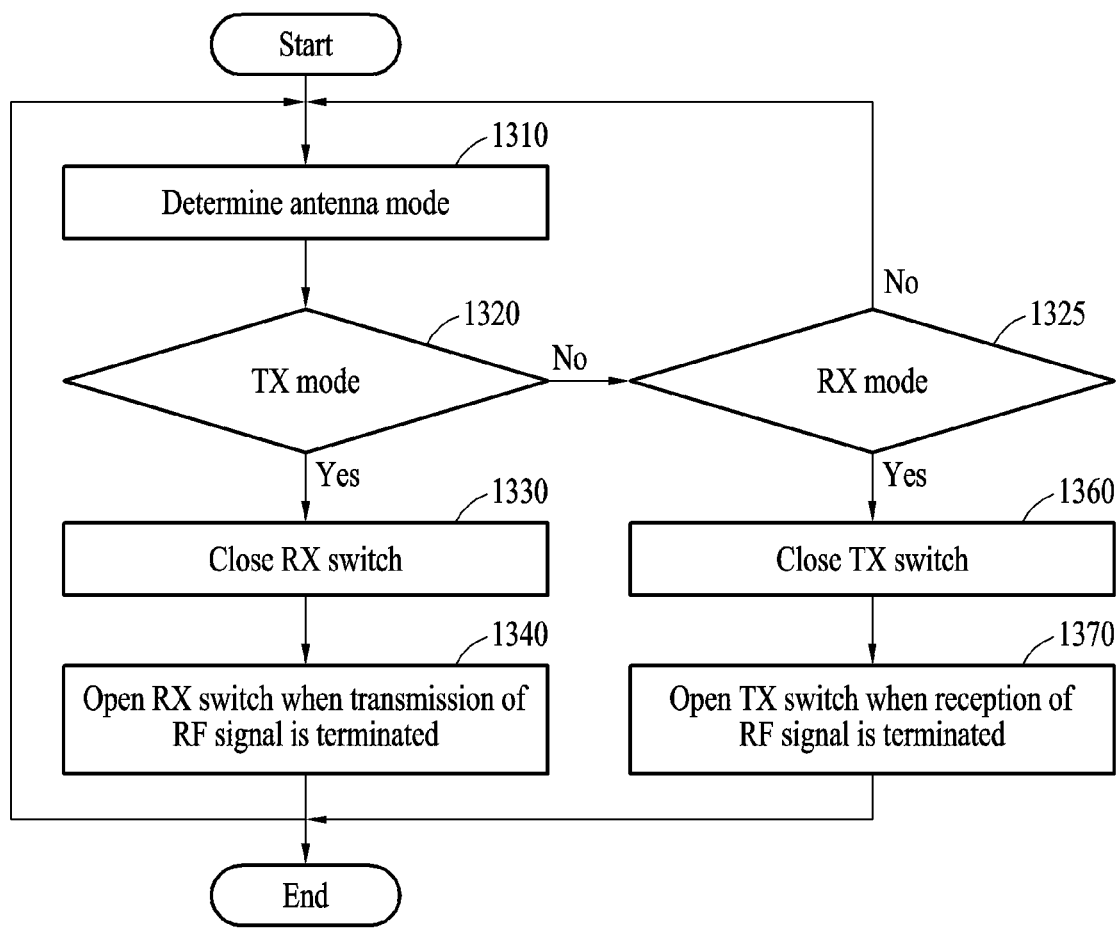
FIG. 13 is a flowchart illustrating an example method of controlling antenna switches of an electronic device, according to various embodiments.

FIG. 13 is a flowchart illustrating an example method of controlling antenna switches of an electronic device, according to various example embodiments.

According to an example embodiment, operations 1310 through 1370 may be performed by a processor (e.g., the control unit 1214 of FIG. 12) of the electronic device described with reference to FIGS. 1 through 11 or the electronic device 1210 of FIG. 12.

In operation 1310, the processor may determine an antenna mode in which an antenna operates. For example, the antenna mode may be a transmission mode or a reception mode. The transmission mode or the reception mode may be determined based on a TDD.

In operations 1320 and 1325, the processor may determine whether the determined antenna mode is the transmission mode or the reception mode. Although operation 1320 is illustrated as being performed first, according to example embodiments, operation 1325 may be performed first and then operation 1320 may be performed.

In operation 1330, when the antenna mode is the transmission mode, the processor may close a reception switch (e.g., the reception switch 851 of FIG. 8). When the reception switch closes, a reception path (e.g., the first path 910 of FIG. 9A) may be regarded as being opened. By regarding the reception path as being opened, interference between an RF signal transmitted via a transmission path (e.g., the second path 920 of FIG. 9B), and the reception path may not occur. Since interference between the transmission path and the reception path does not occur, the transmission quality of the RF signal may improve.

In operation 1340, when the transmission of the RF signal is terminated, the processor may open the reception switch.

In operation 1360, when the antenna mode is the reception mode, the processor may close the transmission switch (e.g., the transmission switch 821 of FIG. 8). When the transmission switch closes, the transmission path (e.g., the second path 920 of FIG. 9B) may be regarded as being opened. By regarding the transmission path as being opened, interference between the RF signal received via the reception path (e.g., the first path 910 of FIG. 9A), and the transmission path may not occur. Since interference between the transmission path and the reception path does not occur, reception quality of the RF signal may improve.

In operation 1370, when the reception of the RF signal is terminated, the processor may open the transmission switch.

An electronic device (e.g., the base station 110 of FIG. 1 or the electronic device 1210 of FIG. 12) according to an example embodiment may include: a switch die (e.g., the third PCB 670 of FIG. 6 or the RFA 770 of FIG. 7) including a first portion transmission path (e.g., the first portion transmission path 820 of FIG. 8) and a first portion reception path (e.g., the first portion reception path 850 of FIG. 8), wherein the first portion transmission path is connected in parallel to a transmission switch (e.g., the transmission switch 821 of FIG. 8), and the first portion reception path is connected in parallel to a reception switch (e.g., the reception switch 851 of FIG. 8); a first connecting unit comprising a conductive material (e.g., the first bump 661 and the first ball 663 of FIG. 6) connected to the first portion transmission path and a second connecting unit comprising a conductive material (the second bump 662 and the second ball 664 of FIG. 6) connected to the first portion reception path; and a radio unit (RU) board (e.g., the second PCB 650 of FIG. 6) including a second portion transmission path (e.g., the second portion transmission path 830 of FIG. 8) connected to the first connecting unit and a second portion reception path (e.g., the second portion reception path 860 of FIG. 8) connected to the second connecting unit, wherein a length of a transmission path (e.g., the second path 920 of FIG. 9B) formed via the first portion transmission path, the first connecting unit, and the second portion transmission path may be determined based on a wavelength of a frequency used to transmit a radio frequency (RF) transmission signal.

The switch die according to an example embodiment may further include a circuit (e.g., the transmitter 810 of FIG. 8) configured to generate the RF transmission signal to be radiated via an antenna (e.g., the antenna 611 of FIG. 6).

The RU board according to an example embodiment may further include a common path (e.g., the common path 370 of FIG. 3) to which the second portion transmission path and the second portion reception path merge.

The electronic device according to an example embodiment may further include an antenna connected to the common path.

The electronic device according to an example embodiment may further include connecting units comprising a conductive material (e.g., the connecting units 620, 630, and 640 of FIG. 6) configured to connect the common path to the antenna.

The antenna according to an example embodiment may include a patch antenna.

The length of the transmission path according to an example embodiment may be ¼ of the wavelength of the frequency used to transmit the RF transmission signal.

When the RF transmission signal is transmitted via the electronic device according to an example embodiment, a reception switch may close such that ground is connected to the first portion reception path.

The length of a reception path (e.g., the first path 910 of FIG. 9A) formed via the first portion reception path, the second connecting unit, and the second portion reception path according to an example embodiment may be determined based on the wavelength of the frequency used to receive an RF reception signal.

When the RF reception signal is received via the electronic device according to an example embodiment, a transmission switch may close such that ground is connected to the first portion transmission path.

The first portion transmission path according to an example embodiment may include a first transmission line (TRL) (e.g., the first TRL 822 of FIG. 8) and a first via (e.g., the first via 823 of FIG. 8), and the transmission switch may be connected in parallel to the first TRL.

The second portion transmission path according to an example embodiment may include a second TRL (e.g., the second TRL 832 of FIG. 8) and a second via (e.g., the second via 831 of FIG. 8), and the first via and the second via may be connected to each other via the first connecting unit.

A wireless communication device (e.g., the base station of FIG. 1) configured to communicate with a terminal according to an example embodiment may include: an antenna unit (e.g., the antenna unit 1211 of FIG. 12) including a plurality of antennas, a power interface unit (e.g., the power interface unit 1212 of FIG. 12) comprising circuitry configured to transmit and receive a signal via the antenna unit, a radio frequency (RF) processing unit (e.g., the RF processing unit 1213 of FIG. 12) comprising circuitry connected to the power interface unit and configured to process the signal, and a control unit (e.g., the control unit 1214 of FIG. 12) comprising control circuitry configured to control an operation of the wireless communication device. The RF processing unit may include: a switch die (e.g., the third PCB 670 of FIG. 6) including a first portion transmission path (e.g., the first portion transmission path 820 of FIG. 8), and a first portion reception path (e.g., the first portion reception path 850 of FIG. 8), wherein the first portion transmission path is connected in parallel to a transmission switch (e.g., the transmission switch 821 of FIG. 8), and the first portion reception path is connected in parallel to a reception switch (e.g., the reception switch 851 of FIG. 8); a first connecting unit comprising a conductive material (e.g., the connecting units 661 and 663 of FIG. 6) connected to the first portion transmission path and a second connecting unit comprising a conductive material (e.g., the connecting units 662 and 664 of FIG. 6) connected to the first portion reception path; and a radio unit (RU) board (e.g., the second PCB 650 of FIG. 6) including a second portion transmission path (e.g., the second portion transmission path 830 of FIG. 8) connected to the first connecting unit and a second portion reception path (the second portion reception path 860 of FIG. 8) connected to the second connecting unit, wherein a transmission path (e.g., the second path 920 of FIG. 9B) formed via the first portion transmission path, the first connecting unit, and the second portion transmission path may be determined based on a wavelength of a frequency used to transmit an RF transmission signal.

The switch die according to an example embodiment may further include a circuit (e.g., the transmitter 810 of FIG. 8) configured to generate the RF transmission signal to be radiated via an antenna (e.g., the antenna 611 of FIG. 6).

The RU board according to an example embodiment may include a common path (e.g., the common path 370 of FIG. 3) to which the second portion transmission path and the second portion reception path merge.

The wireless communication device according to an example embodiment may further include a connecting unit comprising a conductive material (e.g., the connecting units 620, 630, and 640 of FIG. 6) configured to connect the common path to the antenna unit.

The length of the transmission path according to an example embodiment may be ¼ of the wavelength.

When the RF transmission signal is transmitted via the wireless communication device according to an example embodiment, a reception switch may close such that ground is connected to the first portion reception path.

When an RF reception signal is received via the wireless communication device according to an example embodiment, a transmission switch may close such that ground is connected to the first portion transmission path.

A method of controlling an antenna switch, performed by an electronic device (e.g., the base station 110 of FIG. 1 or the electronic device 1210 of FIG. 12) according to an example embodiment, may include: determining (e.g., operation 1310 of FIG. 13) an antenna mode in which an antenna (e.g., the antenna 611 of FIG. 6) of the electronic device operates and controlling (e.g., operation 1330 or operation 1360 of FIG. 13) the antenna switch connected to the antenna based on the determined antenna mode. The antenna switch includes a transmission switch (e.g., the transmission switch 821 of FIG. 8) and a reception switch (e.g., the reception switch 851 of FIG. 8). The electronic device may include a switch die (e.g., the third PCB 670 of FIG. 6) including a first portion transmission path (e.g., the first portion transmission path 820 of FIG. 8) and a first portion reception path (e.g., the first portion reception path 850 of FIG. 8), wherein the first portion transmission path is connected in parallel to a transmission switch (e.g., the transmission switch 821 of FIG. 8), and the first portion reception path is connected in parallel to a reception switch (e.g., the reception switch 851 of FIG. 8); a first connecting unit comprising a conductive material (e.g., the connecting units 661 and 663 of FIG. 6) connected to the first portion transmission path and a second connecting unit comprising a conductive material (e.g., the connecting units 662 and 664 of FIG. 6) connected to the first portion reception path; and a radio unit (RU) board (e.g., the second PCB 650 of FIG. 6) including a second portion transmission path (e.g., the second portion transmission path 830 of FIG. 8) connected to the first connecting unit and a second portion reception path (e.g., the second portion reception path 860 of FIG. 8) connected to the second connecting unit, wherein the length of a transmission path (e.g., the transmission path 920 of FIG. 9B) formed via the first portion transmission path, the first connecting unit, and the second portion transmission path may be determined based on a wavelength of a frequency used to transmit an RF transmission signal.

The example embodiments described herein may be implemented using hardware components, software components and/or combinations thereof. A processing device may be implemented using one or more general-purpose or special purpose computers, such as, for example, a processor, a controller and an arithmetic logic unit (ALU), a digital signal processor, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

Software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described example embodiments, or vice versa.

While this disclosure is illustrated with reference to various example embodiments, it will be understood that the various example embodiments are intended to be illustrative, not limiting. It will be further apparent to one of ordinary skill in the art that various changes in form and details may be made in these example embodiments without departing from the spirit and scope of the disclosure. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure includes all variations within the scope of the claims and their equivalents are to be understood as being included in the disclosure.

What is claimed is:

1. An electronic device comprising:
   a switch die comprising a first portion transmission path comprising a first via and a first transmission line and a first portion reception path, the first portion transmission path being connected in parallel to a transmission switch, and the first portion reception path being connected in parallel to a reception switch;
   a first connecting unit, comprising a conductive material, connected to the first portion transmission path, and a second connecting unit, comprising a conductive material, connected to the first portion reception path; and
   a radio unit (RU) board comprising a second portion transmission path comprising a second via and a second transmission line, the second portion transmission path being connected to the first connecting unit, and a second portion reception path connected to the second connecting unit,
   wherein the first connecting unit comprises a first bump of the RU board electrically connected through the second via to the second transmission line and a first ball of the switch die electrically connected through the first via to the first transmission line, and
   wherein a length of a transmission path formed via the first portion transmission path in the switch die, the first connecting unit, and the second portion transmission path in the RU board is determined based on a wavelength of a frequency used to transmit a radio frequency (RF) transmission signal.

2. The electronic device of claim 1, wherein the switch die further comprises a circuit configured to generate the RF transmission signal to be radiated via an antenna.

3. The electronic device of claim 2, wherein the RU board further comprises a common path to which the second portion transmission path and the second portion reception path merge.

4. The electronic device of claim 3, further comprising: the antenna connected to the common path.

5. The electronic device of claim 4, further comprising: a connecting unit comprising a conductive material configured to connect the common path to the antenna.

6. The electronic device of claim 4, wherein the antenna includes a patch antenna.

7. The electronic device of claim 1, wherein the length of the transmission path is ¼ of the wavelength.

8. The electronic device of claim 1, wherein, based on the RF transmission signal being transmitted via the electronic device, the reception switch is configured to close such that ground is connected to the first portion reception path.

9. The electronic device of claim 1, wherein a length of a reception path formed via the first portion reception path, the second connecting unit, and the second portion reception path is determined based on a wavelength used to receive an RF reception signal.

10. The electronic device of claim 1, wherein, based on an RF reception signal being received via the electronic device, the transmission switch is configured to close such that ground is connected to the first portion transmission path.

11. The electronic device of claim 1, wherein the first portion transmission path comprises:
a first transmission line (TRL); and
a first via,
wherein the transmission switch is connected in parallel to the first TRL.

12. The electronic device of claim 11, wherein the second portion transmission path comprises:
a second TRL; and
a second via,
wherein the first via and the second via are connected to each other via the first connecting unit.

13. A wireless communication device configured to communicate with a terminal, the wireless communication device comprising:
an antenna unit comprising a plurality of antennas;
a power interface unit comprising circuitry configured to transmit and receive a signal via the antenna unit;
a radio frequency (RF) processing unit comprising circuitry connected to the power interface unit and configured to process the signal; and
a control unit comprising circuitry configured to control an operation of the wireless communication device,
wherein the RF processing unit comprises a switch die comprising a first portion transmission path comprising a first via and a first transmission line and a first portion reception path, the first portion transmission path being connected in parallel to a transmission switch, and the first portion reception path being connected in parallel to a reception switch,
wherein the power interface unit comprises a radio unit (RU) board comprising a second portion transmission path comprising a second via and a second transmission line, the second portion transmission path being connected to the first portion transmission path via a first connecting unit comprising a conductive material and a second portion reception path connected to the first portion reception path via a second connecting unit comprising a conductive material,
wherein the first connecting unit comprises a first bump of the RU board electrically connected through the second via to the second transmission line and a first ball of the switch die electrically connected through the first via to the first transmission line, and
wherein a length of a transmission path formed via the first portion transmission path in the switch die, the first connecting unit, and the second portion transmission path in the RU board is determined based on a wavelength of a frequency used to transmit an RF transmission signal.

14. The wireless communication device of claim 13, wherein the switch die comprises a circuit configured to generate the RF transmission signal to be radiated via an antenna.

15. The wireless communication device of claim 14, wherein the RU board comprises a common path to which the second portion transmission path and the second portion reception path merge.

16. The wireless communication device of claim 15, further comprising:
a connecting unit comprising a conductive material configured to connect the common path to the antenna unit.

17. The wireless communication device of claim 13, wherein the length of the transmission path is ¼ of the wavelength.

18. The wireless communication device of claim 13, wherein, based on the RF transmission signal being transmitted via the wireless communication device, the reception switch is configured to close such that ground is connected to the first portion reception path.

19. The wireless communication device of claim 13, wherein, based on an RF reception signal being received via the wireless communication device, the transmission switch is configured to close such that ground is connected to the first portion transmission path.

20. A method of controlling an antenna switch, performed by an electronic device, the method comprising:
determining an antenna mode in which an antenna of the electronic device operates; and
controlling the antenna switch connected to the antenna based on the antenna mode, the antenna switch comprising a transmission switch and a reception switch,
wherein the electronic device comprises:
a switch die comprising a first portion transmission path comprising a first via and a first transmission line and a first portion reception path, the first portion transmission path being connected in parallel to the transmission switch, and the first portion reception path being connected in parallel to the reception switch;
a first connecting unit comprising a conductive material connected to the first portion transmission path and a second connecting unit comprising a conductive material connected to the first portion reception path; and
a radio unit (RU) board comprising a second portion transmission path comprising a second via and a second transmission line, the second portion transmission path being connected to the first connecting unit and a second portion reception path connected to the second connecting unit, wherein the first connecting unit comprises a first bump of the RU board electrically connected through the second via to the second transmission line and a first ball of the switch die electrically connected through the first via to the first transmission line, and wherein a length of a transmission path formed via the first portion transmission path, the first connecting unit, and the second portion transmission path is determined based on a wavelength of a frequency used to transmit a radio frequency (RF) transmission signal.

* * * * *